United States Patent
Okada et al.

(10) Patent No.: US 12,393,183 B2
(45) Date of Patent: Aug. 19, 2025

(54) SIMULATION METHOD, SIMULATION APPARATUS, FILM FORMING APPARATUS, ARTICLE MANUFACTURING METHOD, AND NON-TRANSITORY COMPUTER-READABLE STORAGE MEDIUM

(71) Applicant: CANON KABUSHIKI KAISHA, Tokyo (JP)

(72) Inventors: Tetsuji Okada, Saitama (JP); Yuichiro Oguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 451 days.

(21) Appl. No.: 18/153,005

(22) Filed: Jan. 11, 2023

(65) Prior Publication Data
US 2023/0229151 A1   Jul. 20, 2023

(30) Foreign Application Priority Data
Jan. 20, 2022 (JP) .................... 2022-007272

(51) Int. Cl.
*G05B 19/418* (2006.01)
*B29C 43/00* (2006.01)

(52) U.S. Cl.
CPC ........ *G05B 19/41885* (2013.01); *B29C 43/00* (2013.01); *G05B 2219/32337* (2013.01)

(58) Field of Classification Search
CPC .... G05B 19/41885; G05B 2219/32337; G06F 2113/22; G06F 30/20; G06F 30/12; G06F 2111/04; G06F 2113/08; G01N 21/25; G03F 7/0002; H01L 21/67092; B29C 64/393; B29C 67/24; B29C 43/021;
(Continued)

(56) References Cited

U.S. PATENT DOCUMENTS 8,577,124 B2   11/2013   Toyoda et al.
2010/0103977 A1*  4/2010   Kono .................. B29C 45/7693
                                                                374/57
(Continued)

FOREIGN PATENT DOCUMENTS

JP            3107622 B2 * 11/2000 ......... B29C 33/3835
JP          2006351888 A    12/2006
WO      WO-2019189314 A1 * 10/2019 ............. B29C 70/14

*Primary Examiner* — Chad G Erdman
(74) *Attorney, Agent, or Firm* — ROSSI, KIMMS & McDOWELL LLP

(57) ABSTRACT

The present invention provides a simulation method of predicting a behavior of a composition in processing of bringing the composition arranged on a first member into contact with a second member and forming a film of the composition on the first member, comprising: predicting the behavior of the composition in the processing; calculating a distribution of distortion that occurs in at least one of the first member and the second member in the processing; and displaying the distribution of distortion calculated in the calculating, wherein in the displaying, in a case where at least one piece of input information is selected from a plurality of pieces of input information used to predict the behavior of the composition, the at least one piece of input information is displayed to be superimposed as a two-dimensional image on the distribution of distortion.

17 Claims, 19 Drawing Sheets

(58) Field of Classification Search
CPC ......... B29C 66/71; B29C 70/14; B29C 70/46; B29C 70/465; B29C 2043/3433; B29C 31/006; B29C 33/00; B29C 33/10; B29C 33/306; B29C 33/505; B29C 33/60; B29C 33/62; B29C 43/08; B29C 43/32; B29C 43/34; B29C 48/08; B29C 64/106; B29C 64/40; B29C 65/06; B29C 65/0672; B29C 65/08; B29C 65/1616; B29C 65/1635; B29C 65/1654; B29C 65/1674; B29C 65/1677; B29C 65/3612; B29C 65/4815; B29C 65/5028; B29C 65/5057; B29C 65/8246; B29C 66/0044; B29C 66/1122; B29C 66/1312; B29C 66/30223; B29C 66/30341; B29C 66/54; B29C 66/542; B29C 66/712; B29C 66/7294; B29C 66/73152; B29C 66/73161; B29C 66/73755; B29C 66/7392; B29C 66/73921; B29C 66/7394; B29C 70/003; B29C 2043/3652; B29C 33/42; B29C 33/424; B29C 33/44; B29C 41/36; B29C 43/04; B29C 48/001; B29C 48/0018; B29C 51/00; B29C 63/0034; B29C 64/118; B29C 65/18; B29C 65/4895; B29C 66/474; B29C 66/81455; B29C 66/81811; B29C 66/81812; B29C 67/0044; B29C 69/001; B29C 70/68; B29C 70/763; B29C 2035/0827; B29C 2035/1658; B29C 2037/90; B29C 2043/025; B29C 2043/3634; B29C 2043/465; B29C 2049/503; B29C 2059/023; B29C 2071/022; B29C 2791/001; B29C 2791/005; B29C 2791/006; B29C 2791/007; B29C 2793/0045; B29C 2793/009; B29C 2948/92019; B29C 2948/92409; B29C 2948/92428; B29C 2948/92447; B29C 2948/9258; B29C 2948/9259; B29C 2948/92857; B29C 2948/92885; B29C 2948/92923; B29C 33/0038; B29C 33/40; B29C 33/52; B29C 35/049; B29C 35/0888; B29C 35/16; B29C 39/38; B29C 41/52; B29C 43/222; B29C 43/36; B29C 43/58; B29C 44/569; B29C 48/00; B29C 48/09; B29C 48/13; B29C 48/303; B29C 48/92; B29C 49/482; B29C 49/50; B29C 51/04; B29C 51/10; B29C 51/306; B29C 51/325; B29C 51/34; B29C 51/44; B29C 59/02; B29C 64/112; B29C 64/135; B29C 64/188; B29C 64/218; B29C 64/264; B29C 65/526; B29C 65/665; B29C 66/12423; B29C 66/324; B29C 66/3242; B29C 66/41; B29C 66/53245; B29C 66/8322; B29C 67/202; B29C 70/06; B29C 70/48; B29C 70/54; B29C 71/02

See application file for complete search history.

(56) References Cited

U.S. PATENT DOCUMENTS

2011/0187014 A1* 8/2011 Taylor .................... B29C 59/02
264/40.5
2019/0353475 A1* 11/2019 Walecki ................ G03F 9/7046

* cited by examiner

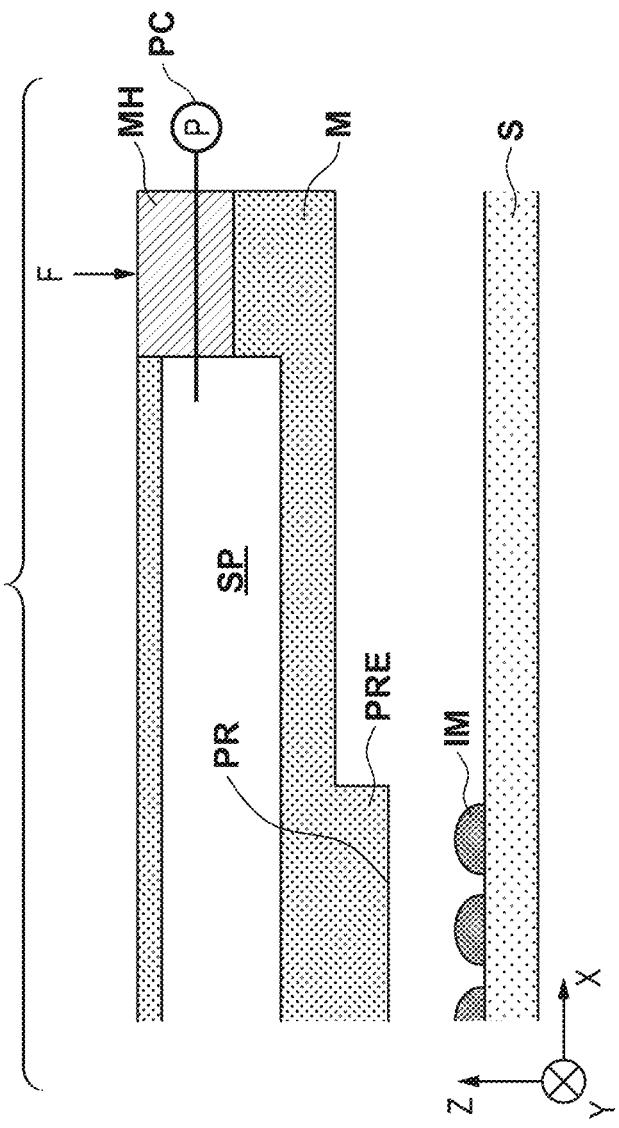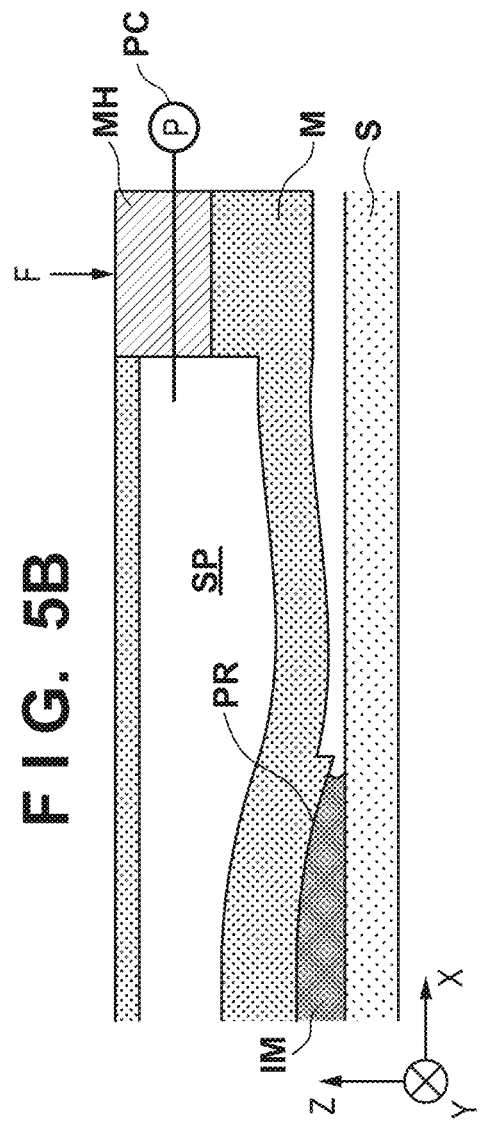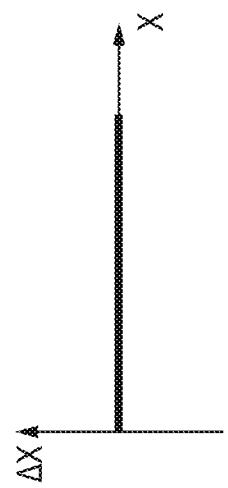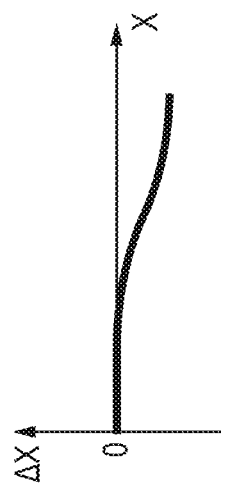

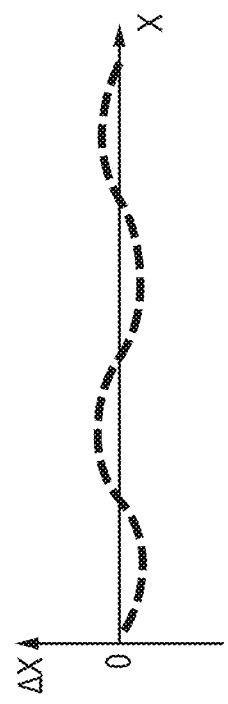
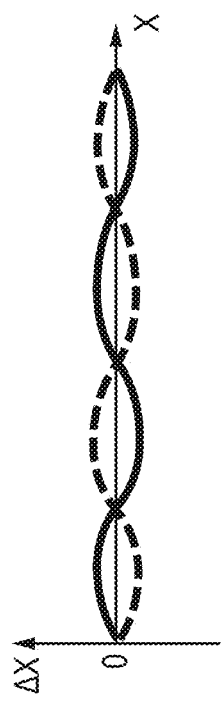
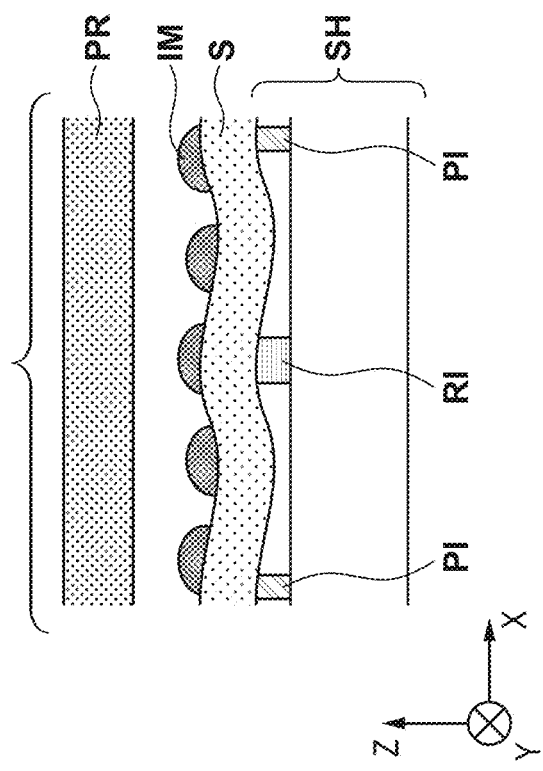
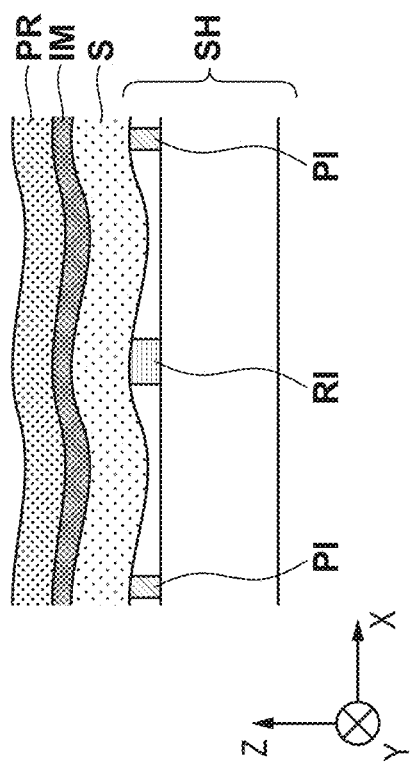

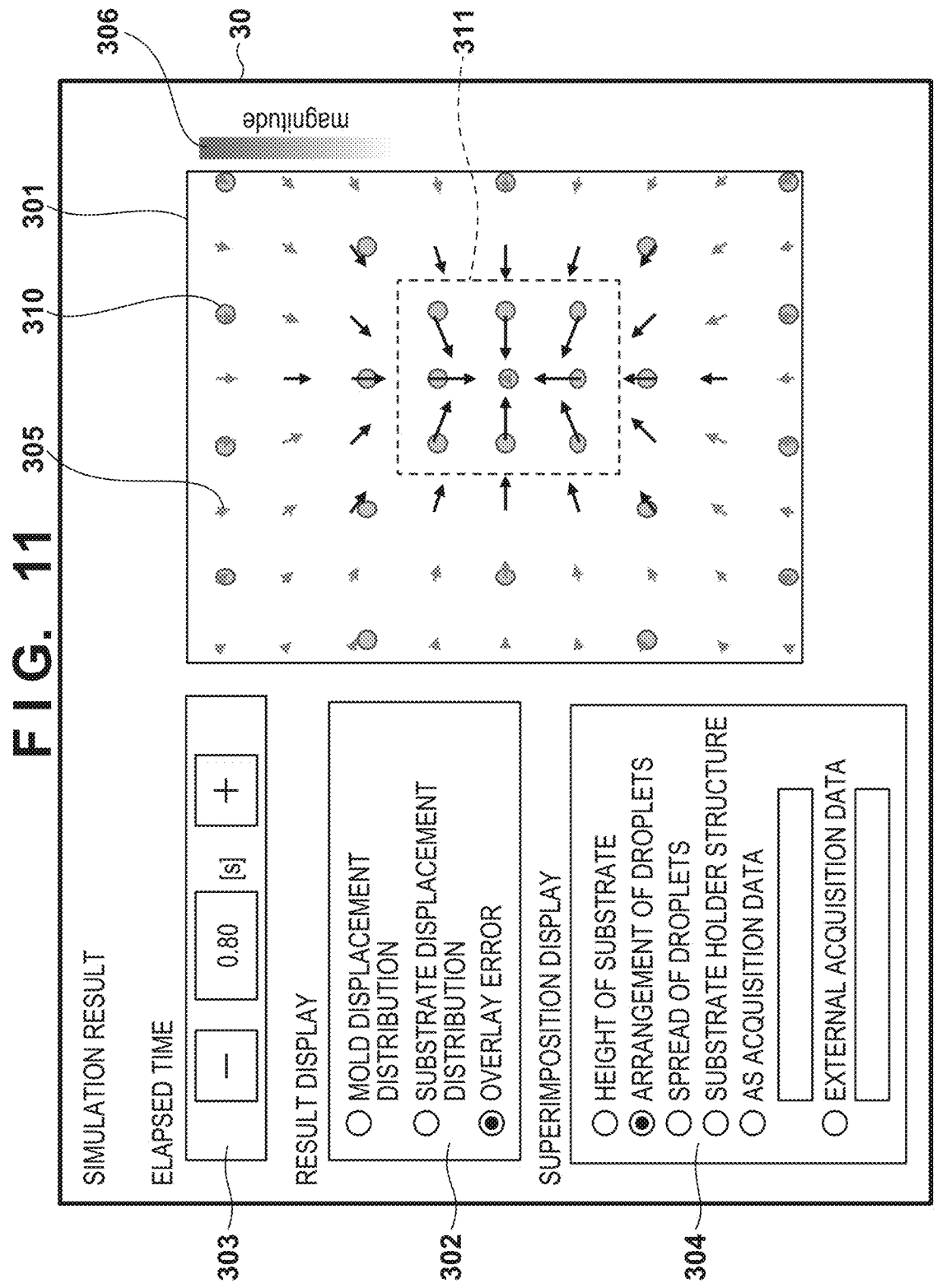

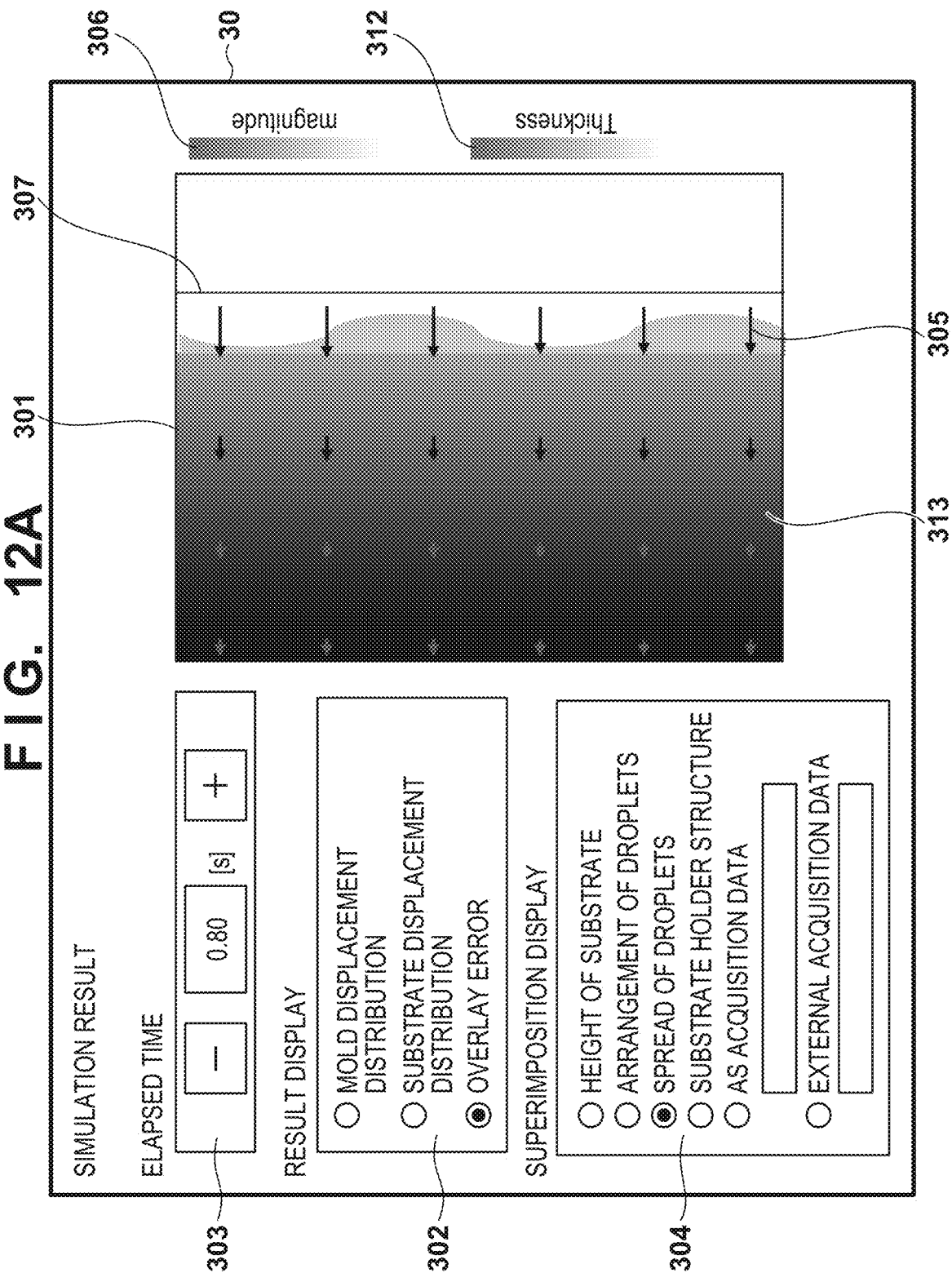

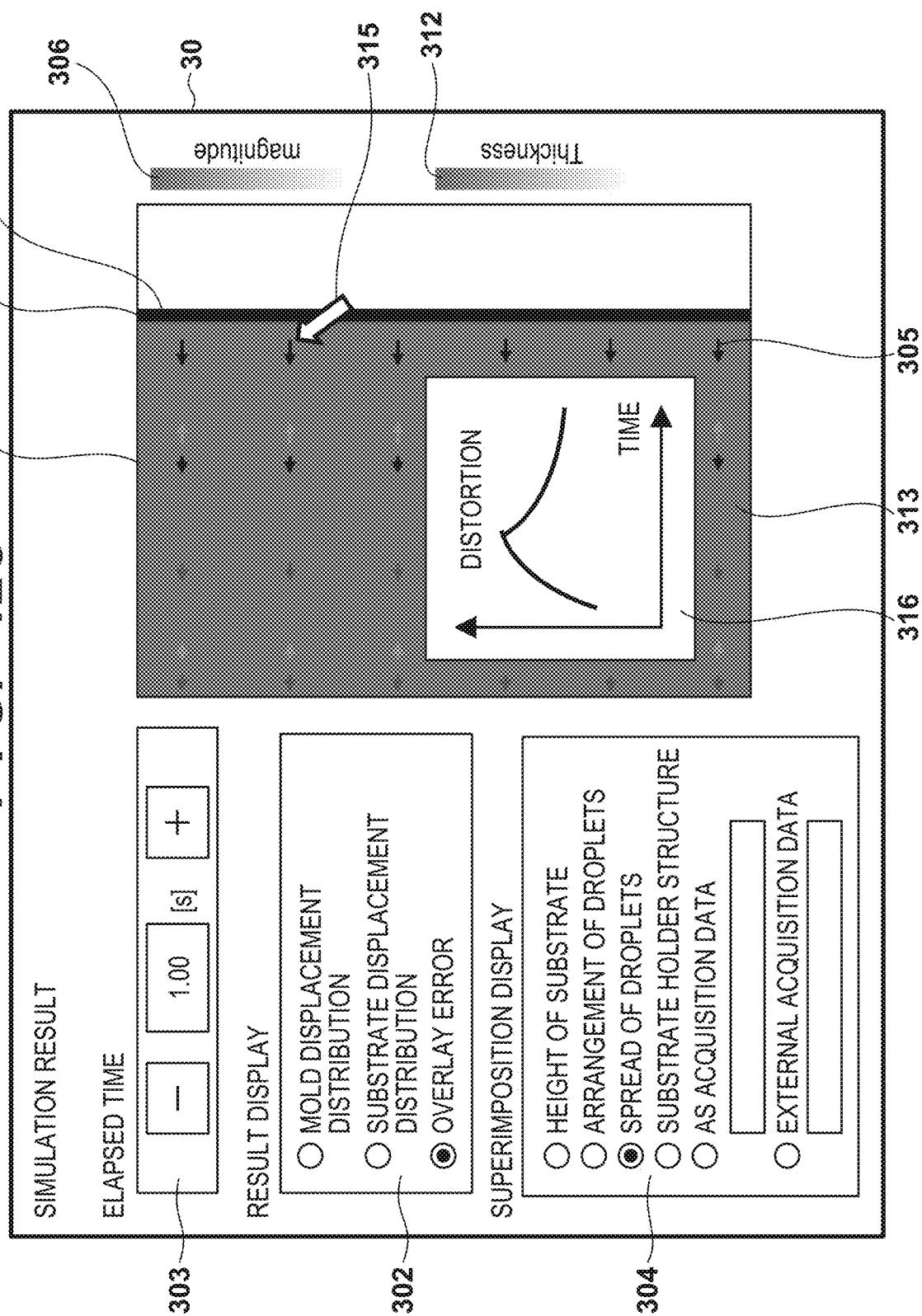

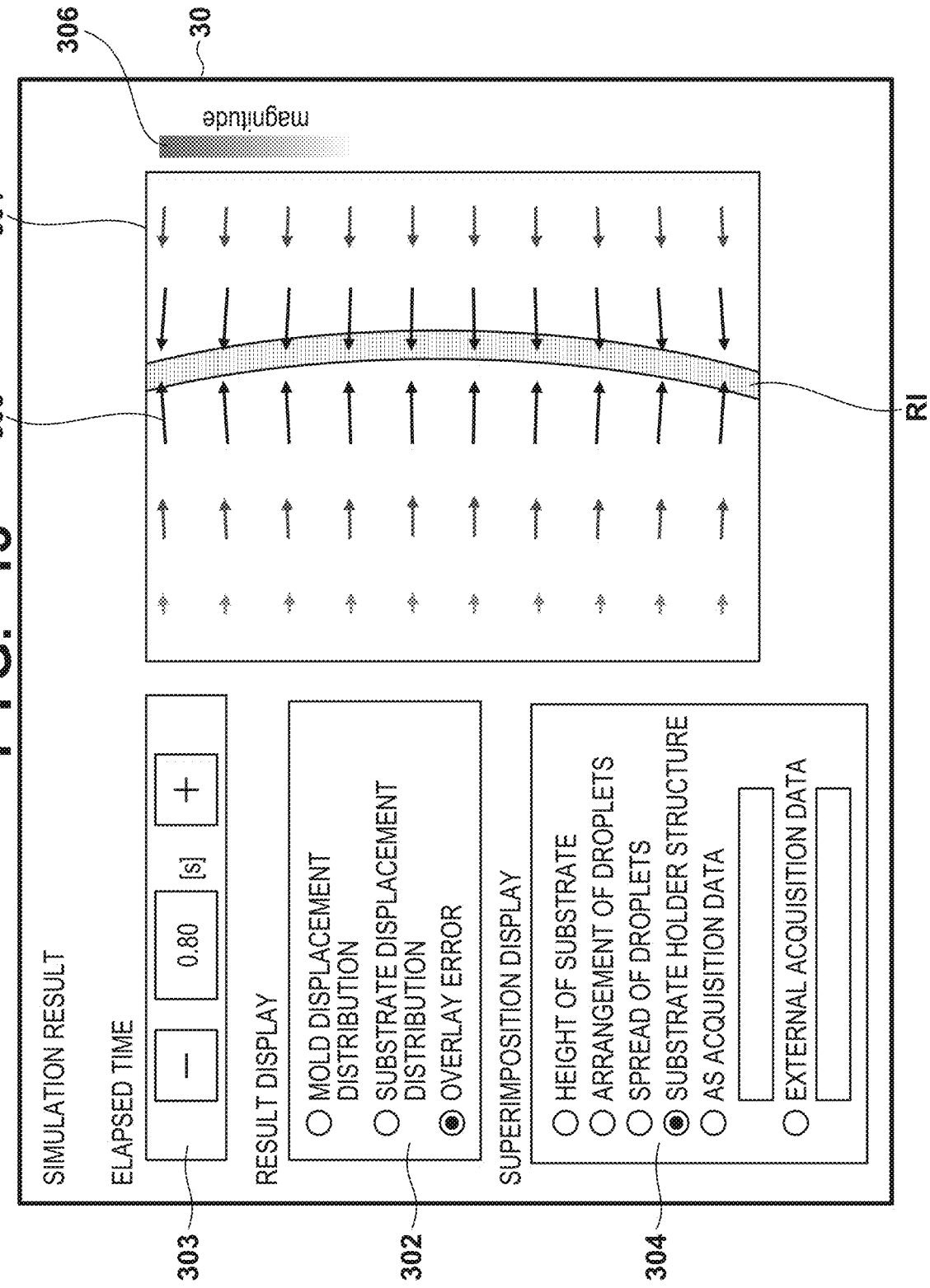

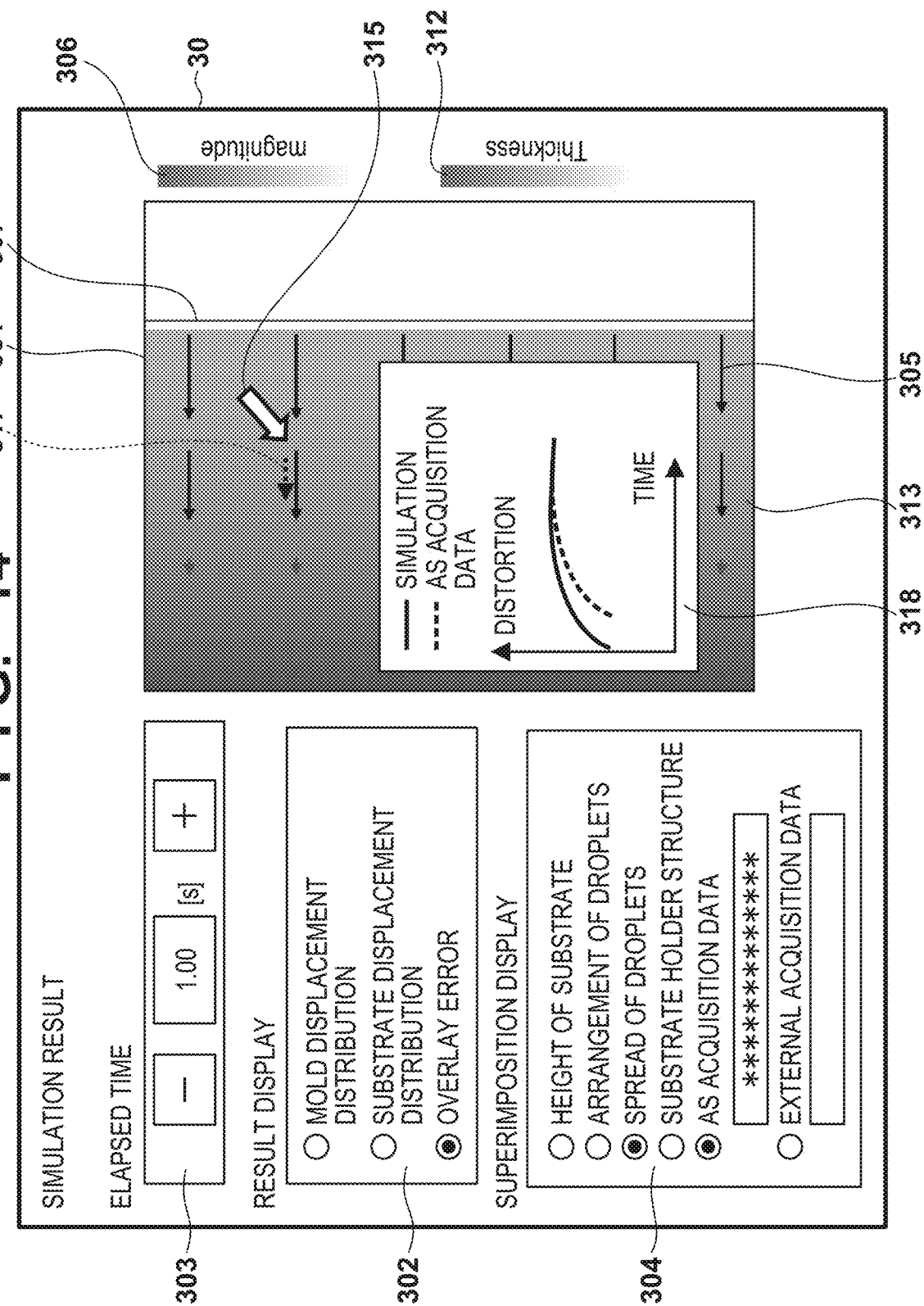

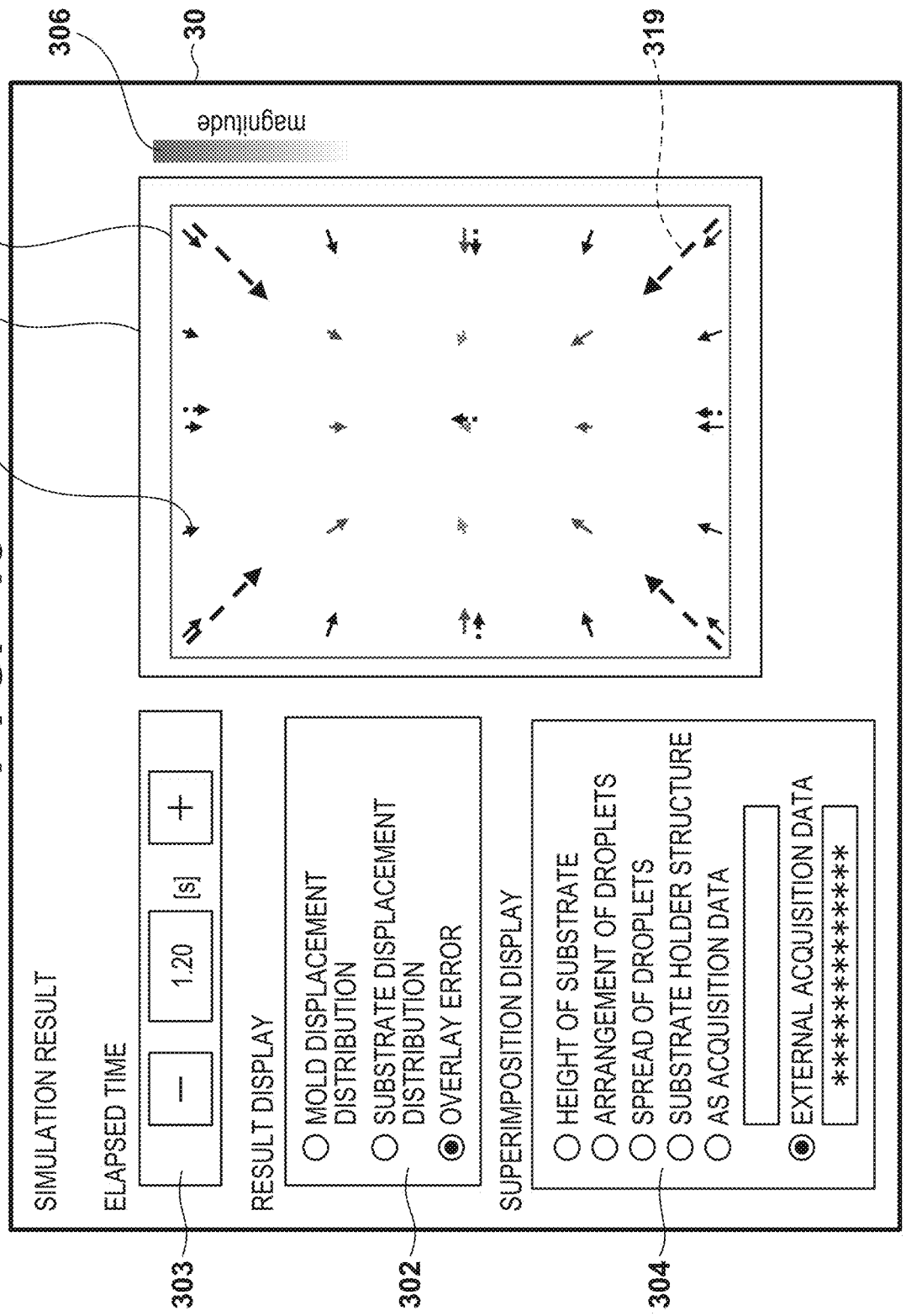

SIMULATION METHOD, SIMULATION APPARATUS, FILM FORMING APPARATUS, ARTICLE MANUFACTURING METHOD, AND NON-TRANSITORY COMPUTER-READABLE STORAGE MEDIUM

BACKGROUND OF THE INVENTION

Field of the Invention

The present invention relates to a simulation method, a simulation apparatus, a film forming apparatus, an article manufacturing method, and a non-transitory computer-readable storage medium.

Description of the Related Art

There is known a film forming technique in which a curable composition is arranged on a substrate, the curable composition and a mold are brought into contact with each other, and the curable composition is cured, thereby forming a film made of the cured product of the curable composition on the substrate. Such a film forming technique is applicable to an imprint technique, a planarization technique, and the like. In the imprint technique, using a mold with a pattern, in a state in which a curable composition on a substrate and the mold are in contact, the curable composition is cured, thereby transferring the pattern of the mold to the curable composition on the substrate. In the planarization technique, using a mold with a flat surface, in a state in which a curable composition on a substrate and the flat surface are in contact, the curable composition is cured, thereby forming a film with a flat upper surface.

For example, in the imprint technique, when newly forming a pattern on a substrate, aligning the pattern to be newly formed with a pattern already formed on the substrate or the structure of the substrate is performed in general. To improve the performance and yield of articles to be manufactured using the imprint technique, it is important to improve the accuracy of the alignment. Japanese Patent Laid-Open No. 2006-351888 describes a technique of, in a case where the pattern of a plurality of layers is included in an image obtained by a scanning electron microscope, separating the pattern for each layer using the design information (CAD data) of the plurality of layers and detecting the positional deviation between the layers.

In the film forming technique, when a mold and a substrate are brought into contact with each other while interposing a curable composition, local deformation (distortion) may occur on the mold and/or the substrate due to convex and concave portions on the substrate surface, the surface tension of the curable composition, the distribution of the curable composition arranged on the substrate, or the like. For example, in a case where convex and concave portions exist on the substrate surface, if the mold and the substrate are brought into contact with each other while interposing the curable composition, deflection according to the convex and concave portions on the substrate surface may locally occur on the mold and/or the substrate, and the positional relationship between the pattern of the mold and the pattern of the substrate may deviate from the design value. As a result, a locally positional deviation occurs between a pattern already formed on the substrate and a pattern newly formed on the substrate using the mold. Such a positional deviation can be corrected by adjusting conditions (to be referred to as film forming conditions hereinafter) such as the distribution of the curable composition arranged as a plurality of droplets on the substrate and pressing of the mold against the curable composition on the substrate. However, to adjust the film forming conditions, the position and cause of the positional deviation need to be specified. Specifying the position and cause of the positional deviation by trial and error using a film forming apparatus (an imprint apparatus or a planarization apparatus) takes enormous time. Hence, use of a simulator is demanded to specify the position and cause of the positional deviation.

SUMMARY OF THE INVENTION

The present invention provides a technique advantageous in, for example, in a simulation for predicting the behavior of a curable composition between two members, specifying the position and cause of a distortion that occurs on at least one of the two members.

According to one aspect of the present invention, there is provided a simulation method of predicting, by an information processing apparatus, a behavior of a composition in processing of bringing the composition arranged on a first member into contact with a second member and forming a film of the composition on the first member, comprising: predicting the behavior of the composition in the processing; calculating a distribution of distortion that occurs in at least one of the first member and the second member in the processing; and displaying the distribution of distortion calculated in the calculating, wherein in the displaying, in a case where at least one piece of input information is selected from a plurality of pieces of input information used to predict the behavior of the composition, the at least one piece of input information is displayed to be superimposed as a two-dimensional image on the distribution of distortion.

Further features of the present invention will become apparent from the following description of exemplary embodiments with reference to the attached drawings.

BRIEF DESCRIPTION OF THE DRAWINGS

FIGS. 5A to 5D are views for explaining displacement that can occur due to the surface tension of a curable composition;

FIGS. 7A to 7D are views for explaining displacement that can occur due to the configuration of the substrate holder;

FIG. 11 is a view showing a display example of a display;

FIG. 12A is a view showing a display example of a display;

FIG. 12C is a view showing a display example of a display;

FIG. 13 is a view showing a display example of a display;

FIG. 14 is a view showing a display example of a display;

FIG. 15 is a view showing a display example of a display;

DESCRIPTION OF THE EMBODIMENTS

Figure 1:
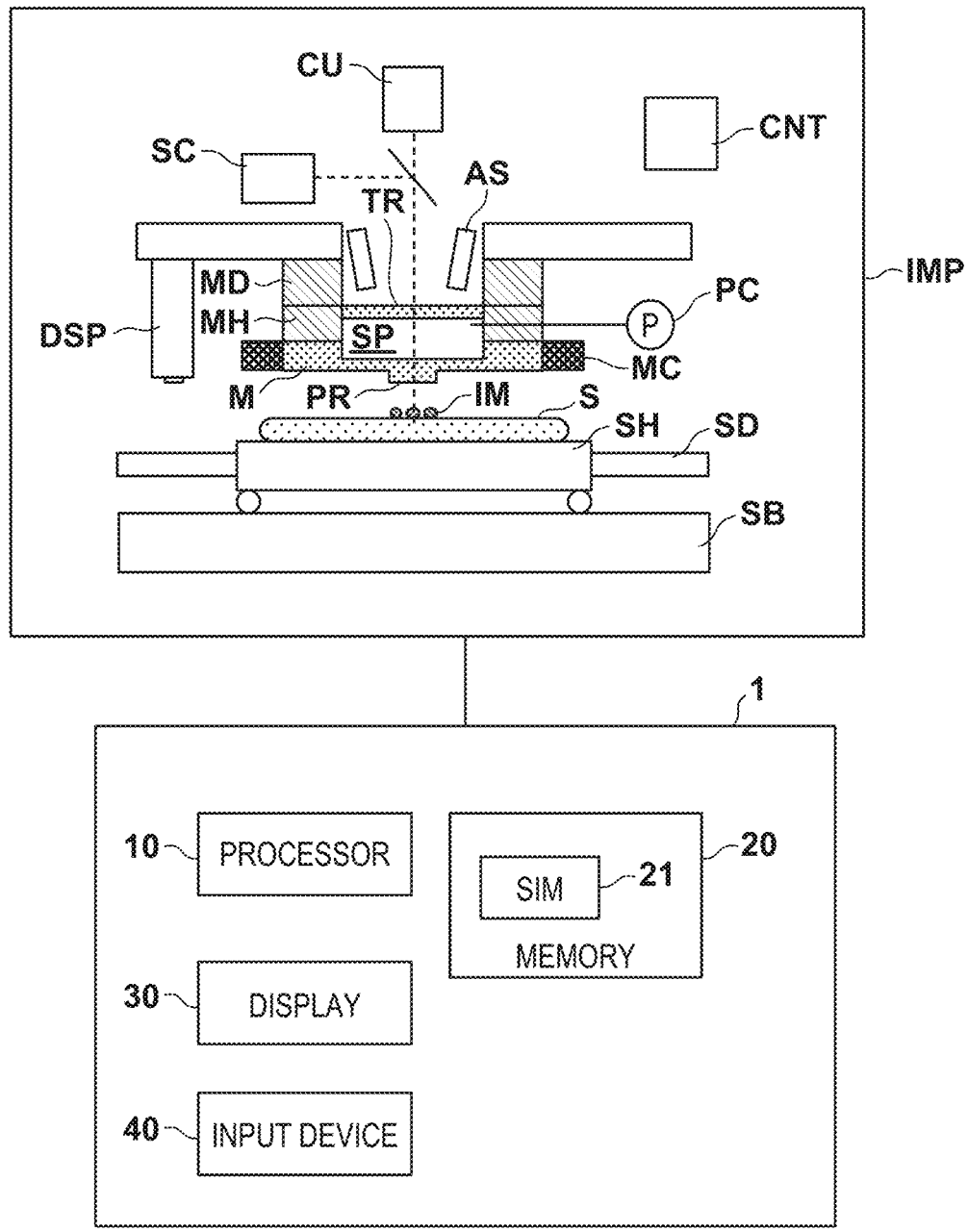
FIG. 1 is a schematic view showing the configuration of a system including a film forming apparatus and an information processing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

The first embodiment according to the present invention will be described. FIG. 1 is a schematic view showing the configuration of a system including a film forming apparatus IMP and an information processing apparatus 1 according to this embodiment. The film forming apparatus IMP executes processing (to be sometimes referred to as film forming processing hereinafter) of bringing a plurality of droplets of a curable composition IM arranged on a substrate S (first member) into contact with a mold M (second member) and forming a film of the curable composition IM in a space between the substrate S and the mold M. The film forming apparatus IMP may be formed as, for example, an imprint apparatus or a planarization apparatus. FIG. 1 shows an example in which the film forming apparatus IMP is formed as an imprint apparatus. Here, the substrate S and the mold M can be replaced with each other, and the film of the curable composition IM may be formed in the space between the mold M and the substrate S by bringing a plurality of droplets of the curable composition IM arranged on the mold M into contact with the substrate S. That is, the first member may be the substrate S, and the second member may be the mold M, or the first member may be the mold M, and the second member may be the substrate S.

As film forming processing, the imprint apparatus performs imprint processing of transferring the pattern of the mold M to the curable composition IM on the substrate S using the mold M with the pattern. The imprint apparatus uses the mold M including a pattern region PR provided with a pattern with convex and concave portions. As imprint processing, the imprint apparatus brings the curable composition IM on the substrate S and the pattern region PR of the mold M into contact with each other, fills the space between the mold M and a region of the substrate S where the pattern should be formed with the curable composition IM, and then cures the curable composition IM. The pattern in the pattern region PR of the mold M is thus transferred to the curable composition IM on the substrate S. The imprint apparatus, for example, forms a pattern made of the cured product of the curable composition IM in each of a plurality of shot regions of the substrate S.

As film forming processing, the planarization apparatus performs planarization processing of planarizing the curable composition IM on the substrate S using the mold M with a flat surface. As planarization processing, the planarization apparatus brings the curable composition IM on the substrate S and the flat surface of the mold M into contact with each other and cures the curable composition IM, thereby forming, on the substrate, a film with a flat upper surface. In the planarization apparatus, in a case where the mold M with a size to cover the whole region of the substrate S is used, a film made of the cured product of the curable composition IM is formed on the whole region of the substrate S.

As the curable composition, a material to be cured by receiving curing energy is used. As the curing energy, an electromagnetic wave or heat is used. The electromagnetic wave includes, for example, light whose wavelength is selected from the range of 10 nm (inclusive) to 1 mm (inclusive), for example, infrared rays, visible light, and ultraviolet light. The curable composition is a composition cured by light irradiation or heating. A photo-curable composition cured by light irradiation contains at least a polymerizable compound and a photopolymerization initiator, and may further contain a nonpolymerizable compound or a solvent, as needed. The nonpolymerizable compound is at least one material selected from the group consisting of a sensitizer, a hydrogen donor, an internal mold release agent, a surfactant, an antioxidant, and a polymer component. The viscosity (the viscosity at 25° C.) of the curable composition is, for example, 1 mPa·s (inclusive) to 100 mPa·s (inclusive). As the material of the substrate, for example, glass, ceramic, a metal, a semiconductor, a resin, or the like is used. A member made of a material different from that of the substrate may be provided on the surface of the substrate, as needed. The substrate includes, for example, a silicon wafer, a compound semiconductor wafer, and silica glass.

In this specification and the accompanying drawings, directions will be indicated on an XYZ coordinate system in which directions parallel to the surface of the substrate S are defined as the X-Y plane. Directions parallel to the X-axis, the Y-axis, and the Z-axis of the XYZ coordinate system are the X direction, the Y direction, and the Z direction, respectively. A rotation about the X-axis, a rotation about the Y-axis, and a rotation about the Z-axis are θX, θY, and θZ, respectively. Control or driving concerning the X-axis, the Y-axis, and the Z-axis means control or driving concerning a direction parallel to the X-axis, a direction parallel to the Y-axis, and a direction parallel to the Z-axis, respectively. In addition, control or driving concerning the θX-axis, the θY-axis, and the θZ-axis means control or driving concerning a rotation about an axis parallel to the X-axis, a rotation about an axis parallel to the Y-axis, and a rotation about an axis parallel to the Z-axis, respectively. In addition, a position is information specified based on coordinates on the X-, Y-, and Z-axes, and a posture is information specified by values on the θX-, θY-, and θZ-axes. Positioning means controlling the position and/or posture.

Example of Configuration of Film Forming Apparatus

The film forming apparatus IMP includes a substrate holder SH that holds the substrate S, a substrate driving mechanism SD that drives (moves) the substrate S by driving the substrate holder SH, and a support base SB that supports the substrate driving mechanism SD. The film forming apparatus IMP also includes a mold holder MH that holds the mold M, and a mold driving mechanism MD that drives (moves) the mold M by driving the mold holder MH.

The substrate driving mechanism SD and the mold driving mechanism MD form a relative driving mechanism that drives at least one of the substrate S and the mold M, that is, relatively drives the substrate S and the mold M such that the relative position between the substrate S and the mold M is adjusted. Adjustment of the relative position between the substrate S and the mold M by the relative driving mechanism includes driving for bringing the mold M into contact with the curable composition IM on the substrate S and driving for separating the mold M from the cured curable composition IM on the substrate S. Also, adjustment of the relative position between the substrate S and the mold M by the relative driving mechanism includes alignment between the substrate S and the mold M. The substrate driving mechanism SD is configured to drive the substrate S concerning a plurality of axes (for example, three axes including the X-axis, the Y-axis, and the θZ-axis, and preferably, six axes including the X-axis, the Y-axis, the Z-axis, the θX-axis, the θY-axis, and the θZ-axis). The mold driving mechanism MD is configured to drive the mold M concerning a plurality of axes (for example, three axes including the Z-axis, the θX-axis, and the θY-axis, and preferably, six axes including the X-axis, the Y-axis, the Z-axis, the θX-axis, the θY-axis, and the θZ-axis).

The film forming apparatus IMP includes a curing device CU configured to cure the curable composition IM filled into the space between the substrate S and the mold M. The curing device CU, for example, applies curing energy to the curable composition IM through the mold M, thereby curing the curable composition IM on the substrate S. The film forming apparatus IMP can include a transmitting member TR configured to form a space SP on the reverse surface side of the mold M (the opposite side of the surface facing the substrate S). The transmitting member TR is made of a material that passes the curing energy from the curing device CU and thus makes it possible to give the curing energy to the curable composition IM on the substrate S. Also, the film forming apparatus IMP can include a pressure controller PC that controls deformation of the mold M in the Z-axis direction by controlling the pressure in the space SP. For example, if the pressure controller PC makes the pressure in the space SP higher than the atmospheric pressure, the mold M is deformed into a convex shape toward the substrate S. When the mold M and the curable composition IM on the substrate S are brought into contact with each other while controlling deformation of the mold M by the pressure controller PC, the contact area between the mold M and the curable composition IM on the substrate S gradually increases, and therefore, bubbles remaining in the curable composition IM between the mold M and the substrate S can be reduced.

The film forming apparatus IMP can include a dispenser DSP configured to arrange, supply, or distribute the curable composition IM onto the substrate S. The dispenser DSP can supply or discharge the curable composition IM onto the substrate S by, for example, a pneumatic, mechanical, or inkjet method. These methods are advantageous in adjusting the distribution of a plurality of droplets of the curable composition IM to be arranged on the substrate S in accordance with the density of the pattern that should be formed on the substrate S. Here, the curable composition IM may be arranged (applied) on the substrate S by an apparatus outside the film forming apparatus IMP using spin coating, slit coating, screen printing, or the like. In this case, the dispenser DSP need not be provided in the film forming apparatus IMP because the substrate S with the curable composition IM arranged thereof by the external apparatus is supplied (loaded) into the film forming apparatus IMP.

The film forming apparatus IMP may include an alignment scope AS (measuring unit) configured to measure a misalignment (alignment error) between the substrate S (or a shot region of the substrate S) and the mold M. Also, the film forming apparatus IMP may include a mold distortion adjuster MC configured to adjust distortion (shape) of (the pattern region PR of) the mold M and/or a substrate distortion adjuster SC configured to adjust distortion (shape) of (the shot region of) the substrate S. It may be understood that the mold distortion adjuster MC and the substrate distortion adjuster SC form a distortion adjuster that reduces or adjusts the difference between distortion of the pattern region PR of the mold M and distortion of the shot region of the substrate S. The mold distortion adjuster MC applies a force in the X and Y directions to the side surfaces of the mold M, thereby deforming the mold M and adjusting distortion of the pattern region PR. The force that the mold distortion adjuster MC inputs to the side surfaces of the mold M can be controlled in accordance with the positional deviation between the substrate S and the mold M, which is measured by the alignment scope AS. The substrate distortion adjuster SC irradiates the substrate S with light having a controlled intensity distribution using, for example, a digital mirror device (DMD), and by a thus formed temperature distribution, adjusts distortion of the shot region of the substrate S. The film forming apparatus IMP shown in FIG. 1 is configured to irradiate the curable composition IM on the substrate S with light from the curing device CU via a half mirror, and irradiate the substrate S with light emitted from the substrate distortion adjuster SC and reflected by the half mirror.

The film forming apparatus IMP can include a controller CNT that controls the units of the film forming apparatus IMP, thereby controlling film forming processing (imprint processing or planarization processing). The controller CNT can be formed by, for example, a computer including a processor such as a CPU and a memory. In the film forming apparatus IMP shown in FIG. 1, the controller CNT and the information processing apparatus 1 are separately provided. However, the controller CNT may be formed as a part of the information processing apparatus 1, or the information processing apparatus 1 may be formed as a part of the controller CNT.

Example of Configuration of Information Processing Apparatus

The information processing apparatus 1 will be described next. The information processing apparatus 1 executes calculation for predicting the behavior of the curable composition IM in film forming processing executed by the film forming apparatus IMP. The information processing apparatus 1 may be understood as a simulation apparatus that predicts the behavior of the curable composition IM in film forming processing. More specifically, the information processing apparatus 1 executes calculation for predicting the behavior of the curable composition IM in film forming processing in which a plurality of droplets of the curable composition IM arranged on the substrate S are brought into contact with the mold M, and a film of the curable composition IM is formed in the space between the substrate S and the mold M. Also, the information processing apparatus 1 executes calculation for predicting the distribution of distortion that occurs on at least one of the substrate S (more specifically, the shot region of the substrate S) and the mold M (more specifically, the pattern region PR of the mold M) in film forming processing. That is, the information processing apparatus 1 executes calculation for predicting the distribution of distortion of the substrate S, the distribution of distortion of the mold M, and/or the distribution of the distortion difference between the substrate S and the mold M in film forming processing.

Here, the distribution of distortion of the substrate S can be defined as the distribution of displacement of the lattice points of a grid set on the substrate S (shot region). Similarly, the distribution of distortion of the mold M can be defined as the distribution of displacement of the lattice points of a grid set on the mold M (pattern region PR). Hereinafter, the distribution of distortion of the substrate S will sometimes be referred to as "the displacement distribution of the substrate S", and the distribution of distortion of the mold M will sometimes be referred to as "the displacement distribution of the mold M". Also, the distribution of the distortion difference between the substrate S and the mold M can be defined as the distribution of the difference between the displacement of the lattice points on the substrate S (shot region) and the displacement of the lattice points on the mold M (pattern region PR), that is, the distribution of the overlay error between the substrate S and the mold M. The distribution of the distortion difference between the substrate S and the mold M will sometimes be referred to as "the overlay error" hereinafter.

The information processing apparatus 1 is formed by, for example, installing a simulation program 21 in a general-purpose or dedicated computer. The information processing apparatus 1 may be formed by a Programmable Logic Device (PLD) such as a Field Programmable Gate Array (FPGA) or an Application Specific Integrated Circuit (ASIC). In an example, the information processing apparatus 1 can be formed by a computer including a processor 10, a memory 20, a display 30 (display unit), and an input device 40 (input unit). The simulation program 21 configured to predict the behavior of the curable composition IM and the distribution of distortion is stored in the memory 20. The processor 10 reads out the simulation program 21 stored in the memory and executes it, thereby performing a simulation for predicting the behavior of the curable composition IM and the distribution of distortion. Note that the memory 20 may be a semiconductor memory, a disk such as a hard disk, or a memory in another form. The simulation program 21 may be stored in a computer-readable memory medium or may be provided to the information processing apparatus 1 via a communication facility such as an electric communication network.

[Operation of Film Forming Apparatus]

The operation of the film forming apparatus IMP will exemplarily be described below. Here, an imprint apparatus will be exemplified as the film forming apparatus IMP (the imprint apparatus will sometimes be referred to as the imprint apparatus IMP hereinafter). The operation is controlled by the controller CNT.

First, the substrate S with the curable composition IM applied is supplied to the imprint apparatus IMP, or the curable composition IM is arranged on one or a plurality of shot regions of the substrate S by the dispenser DSP. Next, the shot region in which a pattern should be formed is positioned under the pattern region PR of the mold M by the substrate driving mechanism SD.

Next, the pattern region PR of the mold M is deformed into a convex shape toward the substrate S by pressurizing the space SP by the pressure controller PC. In this state, the mold M is driven by the mold driving mechanism MD such that the curable composition IM on the shot region and the pattern region PR come into contact with each other. This operation may be done by the substrate driving mechanism SD driving the substrate S. After that, while the pressure controller PC lowers the pressure in the space SP to return the pattern region PR to a flat shape, the contact area between the curable composition IM and the pattern region PR is increased.

After the whole region of the pattern region PR of the mold M comes into contact with the curable composition IM on the substrate S, and the concave portion of the pattern region PR is sufficiently filled with the curable composition IM, the curing device CU supplies curing energy to the curable composition IM, thereby curing the curable composition IM. In a case where the curable composition IM is a photo-curable composition, light, for example, ultraviolet light can be used as the curing energy.

[Matters to be Considered in Simulation]

Figure 2:
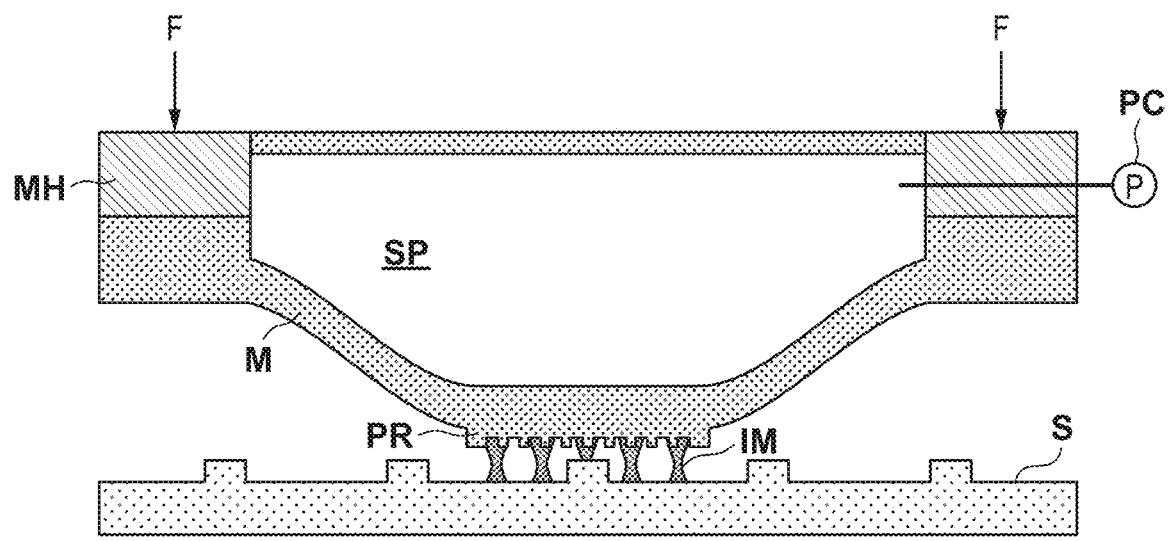
FIG. 2 is a view for explaining matters that can be taken into consideration in a simulation.

Matters that can be taken, by the information processing apparatus 1, into consideration in calculation (simulation) for predicting the displacement distribution of the substrate S, the displacement distribution of the mold M, and the overlay error will be described next with reference to FIG. 2. A force F from the mold driving mechanism MD, (a force by) a pressure P in the space SP, and a force from the curable composition IM can act on the mold M. Forces from the mold M and the substrate S can act on the curable composition IM on the substrate S. Forces from the curable composition IM and the substrate holder SH can act on the substrate S. The behavior of the curable composition IM can be affected by the force received from the mold M, the shape (convex and concave portions) of the surface of the pattern region PR of the mold M, and the shape (convex and concave portions) of the surface of the substrate S. In a case where the curable composition IM is formed by a plurality of droplets, a spread droplet can join with an adjacent droplet. A gas can flow between the substrate S and the mold M. Considering these matters, the deformation of the mold M, the deformation of the substrate S, and the behavior of the flow of the curable composition IM are calculated (solved), and the displacement distribution of the mold M, the displacement distribution of the substrate S, and the overlay error are calculated.

Three displacements of the mold M, which can occur due to the above-described matters considered by the information processing apparatus 1, will exemplarily be described below.

Figure 3A:
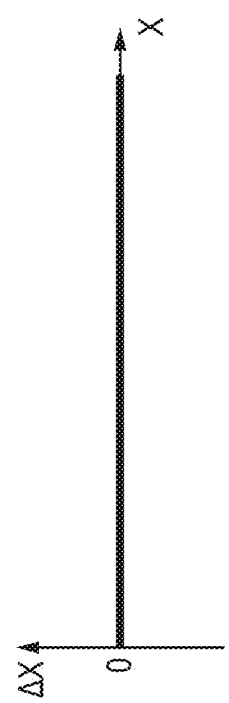
FIGS. 3A to 3D are views for explaining displacement that occurs due to convex and concave portions on the surface of a substrate.
Figure 3B:
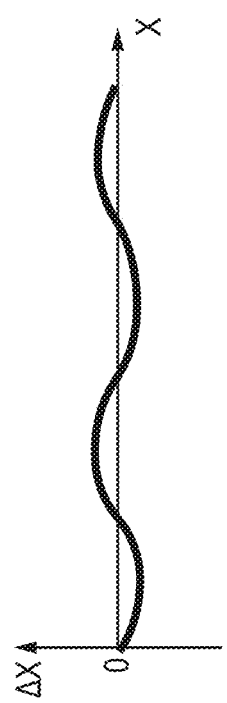
Figure 3C:
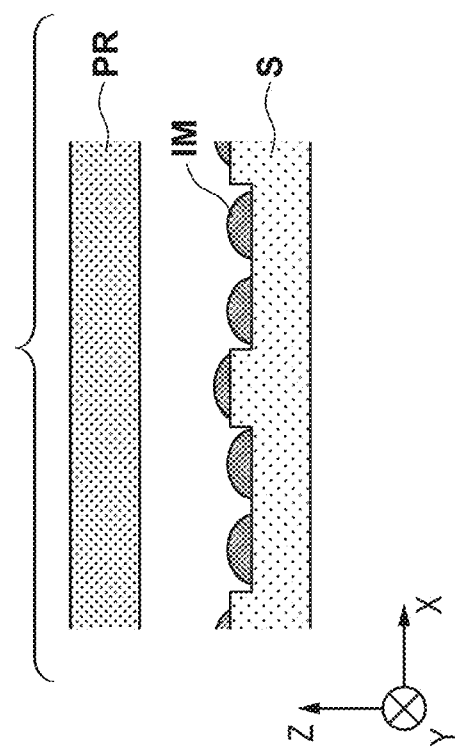
Figure 3D:
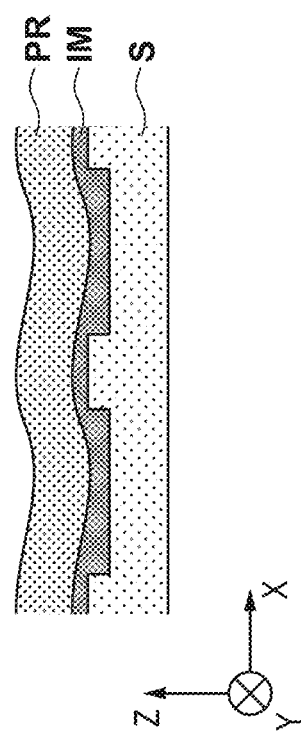

As the first example, displacement that can occur due to the convex and concave portions of the surface of the substrate S will be described. FIG. 3A schematically shows a state in which the curable composition IM is arranged as a plurality of droplets on the substrate S by the dispenser DSP. FIG. 3B schematically shows a state (contact state) in which the pattern region PR of the mold M is in contact with the curable composition IM shown in FIG. 3A. In the contact state, the curable composition IM exists between the substrate S and the pattern region PR, and the pattern region PR has an appropriate rigidity. For this reason, in a case where the film thickness of the curable composition in the concave portion of the substrate S cannot compensate for the depth of the concave portion of the substrate S, the surface of the pattern region PR of the mold M may be deformed in accordance with the concave portion of the substrate S. FIGS. 3C and 3D correspond to FIGS. 3A and 3B, respectively, and show the relationship between the X-direction position and displacement of the pattern region PR. The abscissa represents the position in the X direction, and the ordinate represents the magnitude of displacement at each position in the X direction. If convex and concave portions are generated on the surface of the substrate S, the shape of the surface of the pattern region PR may change in accordance with the convex and concave portions of the surface of the substrate S, and displacement may occur in the in-plane direction (X and Y directions) of the pattern region PR.

Figure 4A:
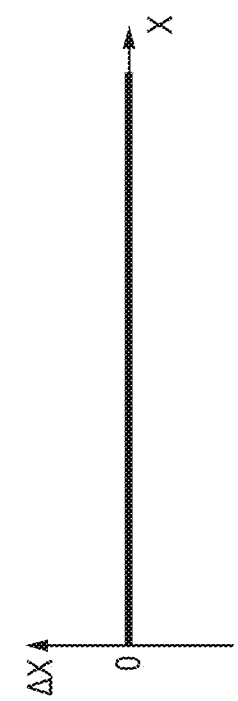
FIGS. 4A to 4D are views for explaining displacement that can occur due to the arrangement of droplets of a curable composition.
Figure 4B:
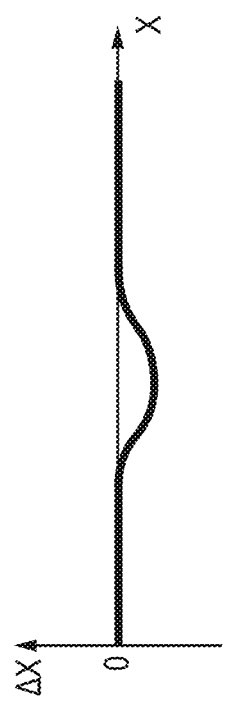
Figure 4C:
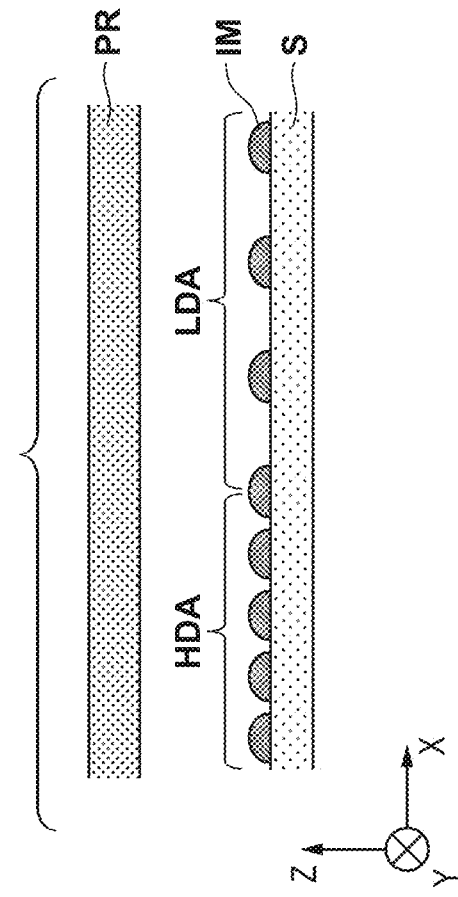
Figure 4D:
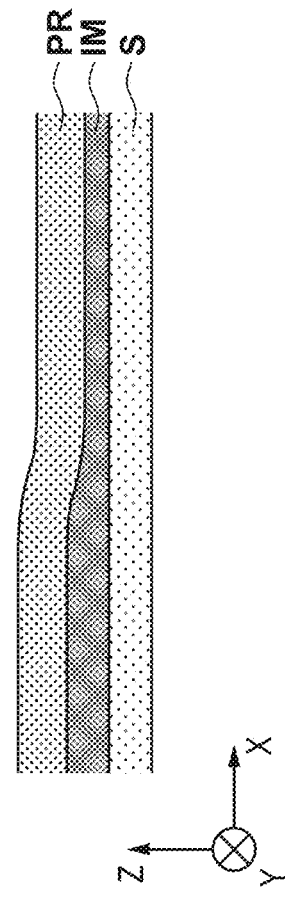

As the second example, displacement that can occur due to the arrangement of the droplets of the curable composition IM on the substrate S will be described. FIG. 4A schematically shows a state in which the curable composition IM is arranged as a plurality of droplets on the substrate S by the dispenser DSP. In the example shown in FIG. 4A, there are a region HDA in which the density of the droplets of the curable composition IM is relatively high and a region LDA in which the density is relatively low. FIG. 4B schematically shows a contact state in which the pattern region PR of the mold M is in contact with the curable composition IM shown in FIG. 4A. Referring to FIG. 4B, in accordance with the density distribution of the droplets of the curable composition IM shown in FIG. 4A, a distribution may be generated in the film thickness of the curable composition IM formed after the droplets are connected. For this reason, the surface of the pattern region PR of the mold M may be deformed in the portion where the film thickness of the curable composition IM changes (that is, the boundary portion between the region HDA and the region LDA). FIGS. 4C and 4D correspond to FIGS. 4A and 4B, respectively, and show the relationship between the X-direction position and displacement of the pattern region PR. The abscissa represents the position in the X direction, and the ordinate represents the magnitude of displacement at each position in the X direction. If the density distribution of the droplets of the curable composition IM is generated, the shape of the surface of the pattern region PR may change in accordance with the density distribution, and displacement may occur in the in-plane direction (X and Y directions) of the pattern region PR.

As the third example, displacement that can occur due to the surface tension of the curable composition IM will be described. FIG. 5A schematically shows a state in which the curable composition IM is arranged as a plurality of droplets on the substrate S by the dispenser DSP. FIG. 5B schematically shows a contact state in which the pattern region PR of the mold M is in contact with the curable composition IM shown in FIG. 5A. FIGS. 5A and 5B show enlarged views of a range including an end portion PRE of the pattern region PR. In the example shown in FIG. 5B, deflection may occur near the end portion PRE of the pattern region PR due to the meniscus pressure of the curable composition IM. FIGS. 5C and 5D correspond to FIGS. 5A and 5B, respectively, and show the relationship between the X-direction position and displacement of the pattern region PR. The abscissa represents the position in the X direction, and the ordinate represents the magnitude of displacement at each position in the X direction.

In FIGS. 3A to 3D, FIGS. 4A to 4D, and FIGS. 5A to 5D, only the displacement of the mold M has been described. Like the mold M, displacement can similarly occur on the substrate S on which the force from the curable composition IM acts. The information processing apparatus 1 can calculate the displacement of the substrate S as well.

Figure 6A:
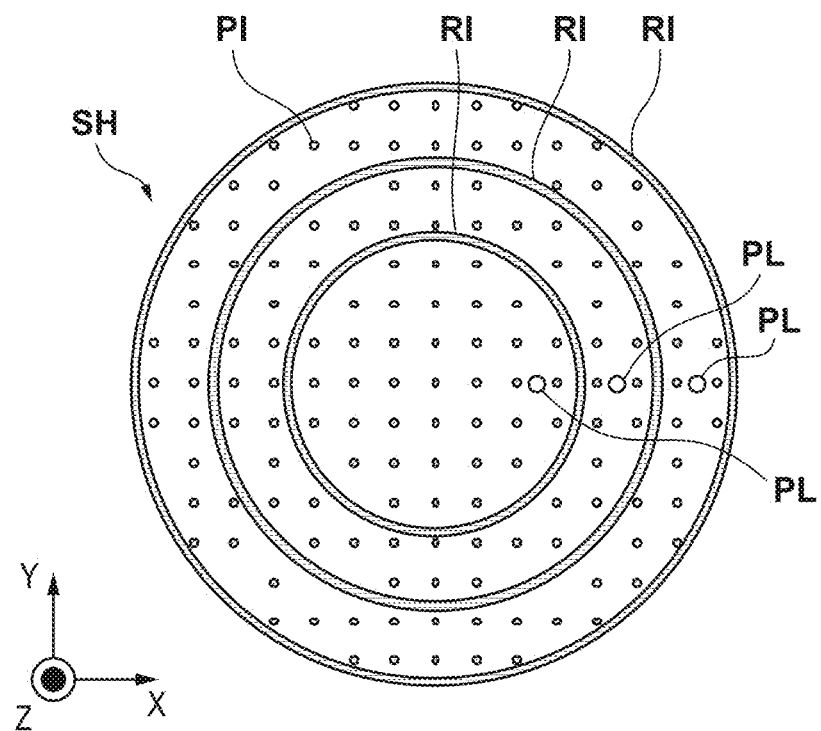
FIGS. 6A and 6B are schematic views showing the configuration of a substrate holder.
Figure 6B:
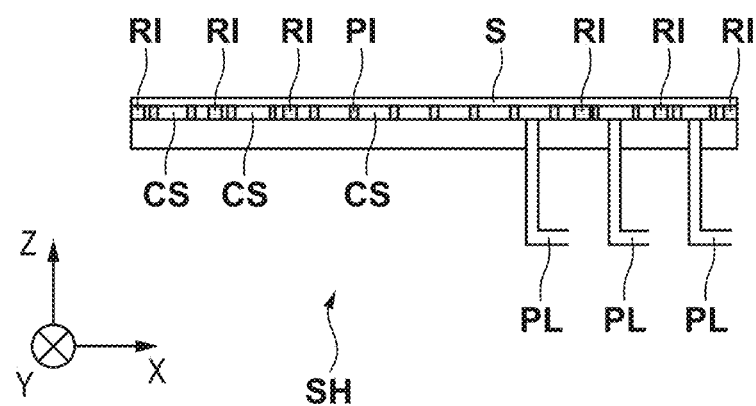

An example of displacement of the substrate S is displacement that can occur due to the force from the substrate holder SH. FIG. 6A is a plan view of the substrate holder SH viewed from the mold M. As shown in FIG. 6A, a plurality of ribs RI and a plurality of pins PI are formed on the upper surface (the surface facing the substrate S or the holding surface) of the substrate holder SH. FIG. 6B shows an X-Z cross-section of the substrate holder SH in a state in which the substrate S is held. The plurality of ribs RI form closed spaces CS by the substrate S. Each closed space CS communicates with a pressure adjuster including a pressure application unit such as a pump (not shown) via a pipe PL and the pressure in the closed space CS can be adjusted. Normally, a negative pressure is applied to the closed space CS so that the substrate holder SH vacuum-sucks the substrate S. However, the method of applying the pressure to the closed space CS is not limited to this. A positive pressure may be applied to some of the plurality of closed spaces CS to deform the substrate S such that it curves in a direction to separate from the substrate holder SH. Here, the numbers and shapes of ribs RI and pins PI of the substrate holder SH are not limited to those shown in FIGS. 6A and 6B, and at least one closed space CS needs to be formed. Also, as the substrate holder SH, a vacuum chuck mechanism that holds the substrate S by vacuum suction has been exemplified. However, the present invention is not limited to this and, for example, an electrostatic chuck mechanism that holds the substrate S by an electrostatic attraction may be used.

FIG. 7A schematically shows a state in which the curable composition IM is arranged as a plurality of droplets on the substrate S held by the substrate holder SH. By vacuum suction, a downward force acts on the lower surface (the surface facing the substrate holder SH) of the substrate S. At this time, the substrate S is deformed into a curved shape by receiving an upward reaction force from the ribs RI and the pins PI on the surface in contact with the ribs RI and the pins PI. FIG. 7B schematically shows a contact state in which the pattern region PR of the mold M is in contact with the curable composition IM shown in FIG. 7A. In the contact state, the pattern region PR is deformed into a shape conforming to the shape of the surface of the substrate S. FIGS. 7C and 7D correspond to FIGS. 7A and 7B, respectively, and show the relationship between the X-direction position and displacement for each of the upper surface (the surface facing the pattern region PR) of the substrate S and the pattern region PR. The abscissa represents the position in the X direction, and the ordinate represents the magnitude of displacement at each position in the X direction. A solid line indicates the displacement distribution in the X direction on the pattern region PR, and a dotted line indicates the displacement distribution in the X direction on the substrate S. The difference between these (the difference between the solid line and the dotted line) is the distribution of overlay errors in the X direction.

Display Example on Display

Figure 8:
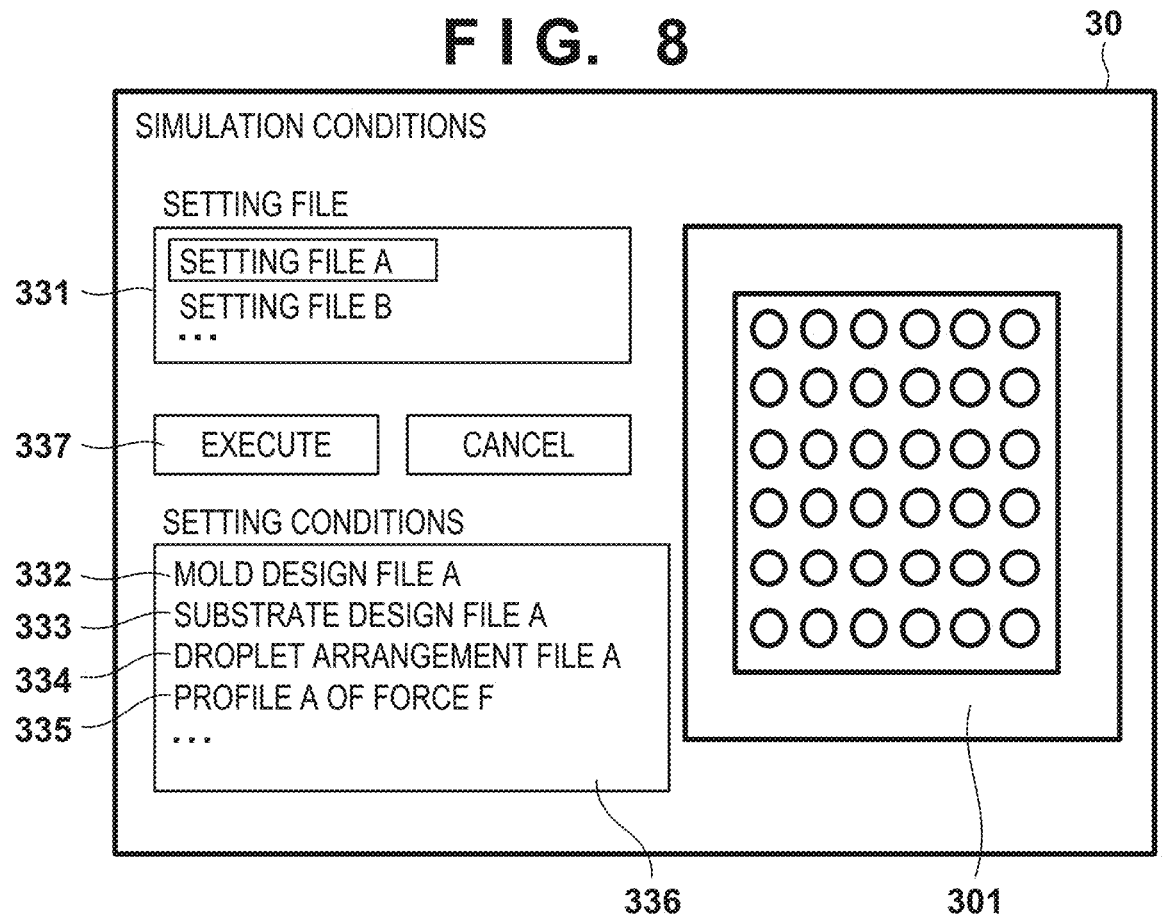
FIG. 8 is a view showing a user interface used to set simulation conditions.

A user interface used to set simulation conditions provided (displayed) on the display 30 of the information processing apparatus 1 will be described first. In this embodiment, as shown in FIG. 8, a user inputs information necessary for a simulation via the input device 40 while referring to the user interface provided on the display 30. Accordingly, based on the information input by the user, the information processing apparatus 1 executes a simulation for predicting the behavior of the curable composition in film forming processing and calculating the displacement distribution of the mold M, the displacement distribution of the substrate S, and/or an overlay error.

For example, a plurality of types of setting files 331 are created in advance and stored in the memory 20 of the information processing apparatus 1. The user can select the setting file 331 according to desired simulation conditions from the plurality of types of setting files 331. The setting file 331 is a file that integrally manages the conditions of film forming processing to be simulated, and includes, as simulation conditions (setting conditions), a plurality of pieces of input information to be used to predict the behavior of the curable composition IM in film forming processing. The setting file 331 can include, for example, a mold design file 332, a substrate design file 333, a droplet arrangement file 334, and a time profile 335.

The mold design file 332 can include, as input information, information representing the surface structure (height distribution) of the mold M, such as the design information of a pattern with convex and concave portions provided in the pattern region PR of the mold M. The substrate design file 333 can include, as input information, information representing the surface structure (height distribution) of the substrate S, such as the information of a pattern with convex and concave portions already formed in the shot region of the substrate S or the design information of the structure of convex and concave portions of the substrate S. The droplet arrangement file 334 can include, as input information, information representing the distribution of a plurality of droplets of the curable composition IM arranged on the substrate S. The distribution of the plurality of droplets may be understood as the volume and arrangement of the droplets of the curable composition IM supplied to the substrate S by the dispenser DSP. The time profile 335 can include, as input information, the temporal profile of the force F that the mold driving mechanism MD applies to the mold M. Here, in the example shown in FIG. 8, four specific files are shown as the simulation conditions included in the setting file 331. Even a simulation condition that is not shown in FIG. 8 may be stored as a file in the memory 20 to form a library. For example, the setting file 331 may include, as input information, information representing the structure of the holding surface of the substrate holder SH that holds the substrate S (for example, the height distribution of the holding surface, and the arrangement of the plurality of ribs RI and the plurality of pins PI).

The files included in the setting file 331 are normally stored in the memory 20 in advance. When the plurality of files are stored in the memory 20 to form a library, the simulation conditions (analysis conditions) can easily be set. The file name of each file included in the setting file 331 is displayed in a condition display window 336. Also, in a visual window 301, image information concerning the setting file 331 is displayed to prevent an input error (selection error) of the setting file 331. When executing a simulation, the user confirms the information displayed in the condition display window 336 and the visual window 301, and, if there is no problem, operates an execution button 337. Thus, in the processor 10, simulation calculation by the simulation program 21 is started. A simulation result (prediction result) created by the simulation calculation is stored in the memory 20.

A user interface used to refer to the simulation result (prediction result) provided on the display 30 of the information processing apparatus 1 will be described next. In this embodiment, the user selects, via the input device 40, a simulation result to be displayed on the display 30 while referring to the user interface shown in FIG. 9. Accordingly, the information processing apparatus 1 (processor 10) displays, as the simulation result selected by the user, the displacement distribution of the mold M, the displacement distribution of the substrate S, and/or the overlay error in the visual window 301. Here, the size, shape, number, and the like of simulation results displayed in the visual window 301 are not limited to those shown in FIG. 9, and these may arbitrarily be changed in accordance with the target to be displayed as the simulation result and displayed on the display 30.

Figure 9:
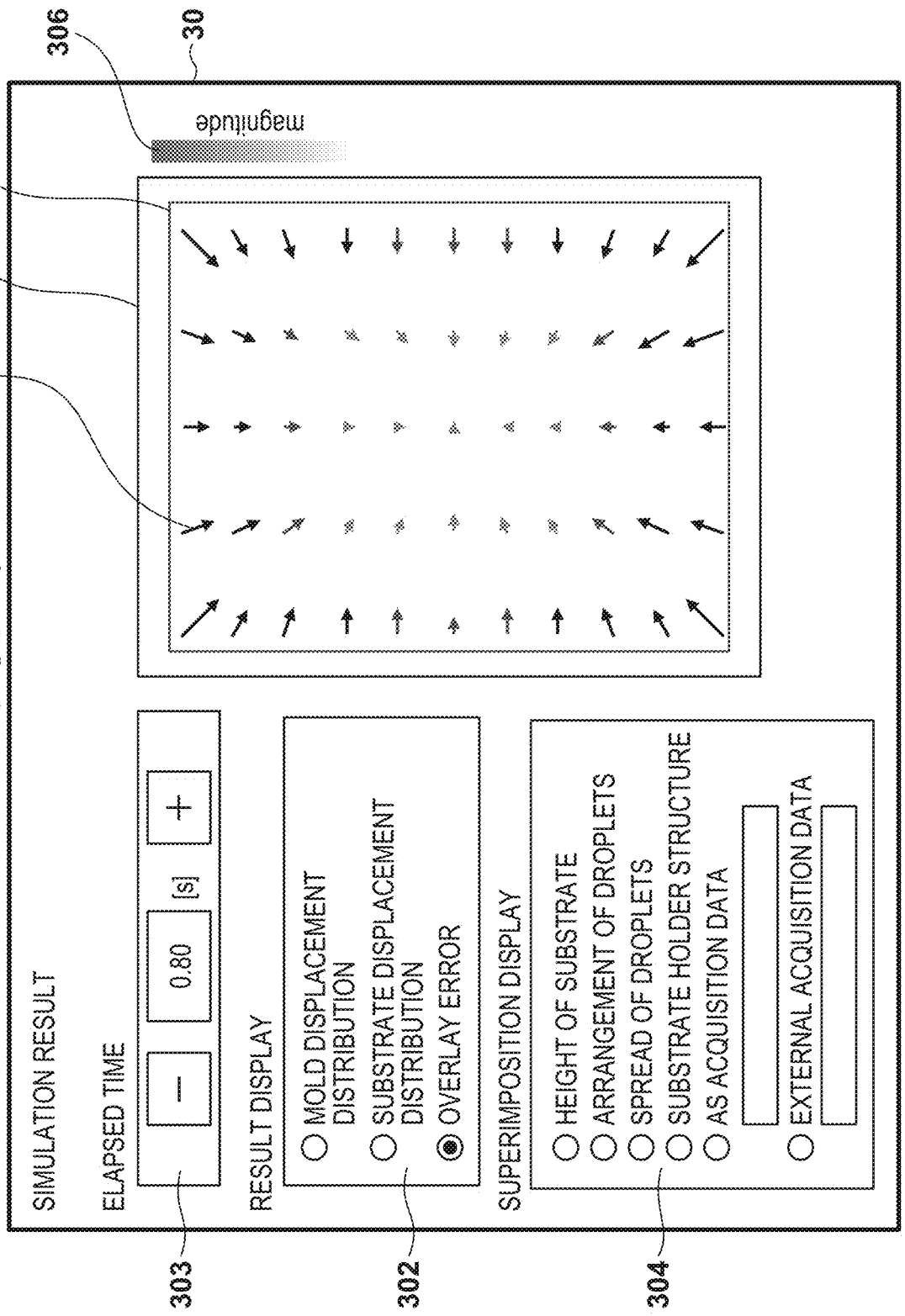
FIG. 9 is a view showing a display example of a display.

A result display selection field 302 shown in FIG. 9 is a radio button used to select a simulation result to be displayed in the visual window 301. In the example shown in FIG. 9, items of a simulation result to be displayed in the visual window 301 are "displacement distribution of mold", "displacement distribution of substrate", and "overlay error", and the user selects "overlay error" from these. A case where the overlay error is selected will exemplarily be described below, and the same applies to a case where the displacement distribution of the mold or the displacement distribution of the substrate is selected.

A plurality of vectors 305 displayed in the visual window 301 visualize the magnitudes and directions of distortion on a plane (X and Y directions) parallel to the film formed by the curable composition IM. Distortion means the displacement of the lattice points of the mold M, the displacement of the lattice points of the substrate S, and/or the overlay error, as described above. The magnitude of distortion is visualized by the length and color of a vector and displayed. A color bar 306 shows the relationship between a color and a magnitude of distortion. In the example shown in FIG. 9, since the user selects "overlay error" in the result display selection field 302, the overlay error is displayed as the plurality of vectors 305 in the visual window 301. In this embodiment, the distortion is displayed as vectors. However, the present invention is not limited to this and, for example, the distortion may be displayed as a wire frame or the like.

An outer periphery 307 indicates the outer periphery of the pattern region PR of the mold M (or the outer periphery of the shot region of the substrate S). In the example shown in FIG. 9, the whole of the pattern region PR is displayed in the visual window 301. However, the present invention is not limited to this, and only a specific region may be displayed in an enlarged state as needed.

An elapsed time 303 indicates an elapsed time in film forming processing (imprint processing or planarization processing). In this embodiment, the information processing apparatus 1 (processor 10) calculates the temporal change of the behavior of the curable composition IM and the temporal change of the distribution of distortion (the displacement distribution of the mold M, the displacement distribution of the substrate S, and the overlay error) in film forming processing. Hence, the distribution of distortion at an arbitrary timing (elapsed time) in film forming processing can be displayed in the visual window 301. In the example shown in FIG. 9, the time at which the curable composition IM starts contacting the mold M is defined as a reference time (0 [s]). However, the reference time can arbitrarily be changed. Also, in the example shown in FIG. 9, a minus button and a plus button used to change the elapsed time are provided on both sides of the display of the elapsed time. By using these, the distribution of distortion at a desired elapsed time can be displayed in the visual window 301. The user can advance the elapsed time by operating the plus button via the input device 40, and can return the elapsed time by operating the minus button via the input device 40.

Here, in the visual window 301 shown in FIG. 9, only the distribution of distortion is displayed. In this case, the user can evaluate the magnitude and direction of distortion, but it is difficult to grasp why the distortion occurs. In this embodiment, the distribution of distortion and information (item) that can be the occurrence factor of the distortion can be displayed comparatively. More specifically, in a case where at least one piece of input information is selected from a plurality of pieces of input information used to predict the behavior of the curable composition IM, the at least one piece of input information is displayed to be superimposed as a two-dimensional image on the distribution of distortion. To do this, in this embodiment, a superimposition display selection field 304 is provided. Note that the two-dimensional image may be understood as a plane image in the X and Y directions, and will sometime be referred to as a two-dimensional image hereinafter.

The superimposition display selection field 304 includes check boxes used to select information (to be referred to as superimposition display information hereinafter) to be superimposed on the distribution of distortion. As a type of superimposition display information, input information used to predict the behavior of the curable composition IM is included. As the input information, for example, at least one of information representing the surface structure of the substrate S, information representing the surface structure of the mold M, information representing the distribution of a plurality of droplets of the curable composition IM arranged on the substrate S, and information representing the structure of the holding surface of the substrate holder SH is included. In the example shown in FIG. 9, "height (surface structure) of the substrate", "arrangement (distribution) of droplets", and "structure of substrate holder" are included in the superimposition display selection field 304 to be selectable.

Also, as a type of superimposition display information, output information representing the simulation result (prediction result) of the behavior of the curable composition IM may be included. As the output information, information representing the simulation result of the temporal change of the behavior of the curable composition IM (for example, spread of the plurality of droplets) can be used. In the example shown in FIG. 9, "spread of droplets" is included, as the output information, in the superimposition display selection field 304 to be selectable. Furthermore, as a type of superimposition display information, measurement information representing a result of actually measuring the overlay error between the mold M (pattern region PR) and the substrate S (shot region) may be included. As the measurement information, at least one of the measurement result of an overlay error acquired by the alignment scope AS and the measurement result of an overlay error acquired by an external apparatus can be used. In the example shown in FIG. 9, "AS acquisition data" representing the measurement result of the alignment scope AS and "external acquisition data" representing the measurement result of the external apparatus are included, as the measurement information, in the superimposition display selection field 304 to be selectable.

In a case where the user selects at least one piece of information in the superimposition display selection field 304, the information (item) selected by the user is displayed to be superimposed as a two-dimensional image on the distribution of distortion (the plurality of vectors 305) in the visual window 301. At this time, the two-dimensional image of the information selected by the user and the distribution of distortion (the plurality of vectors 305) are relatively aligned and displayed in the visual window 301. Such display processing is performed by the processor 10. In the superimposition display selection field 304, the use can select an arbitrary number of information (items).

Figure 10:
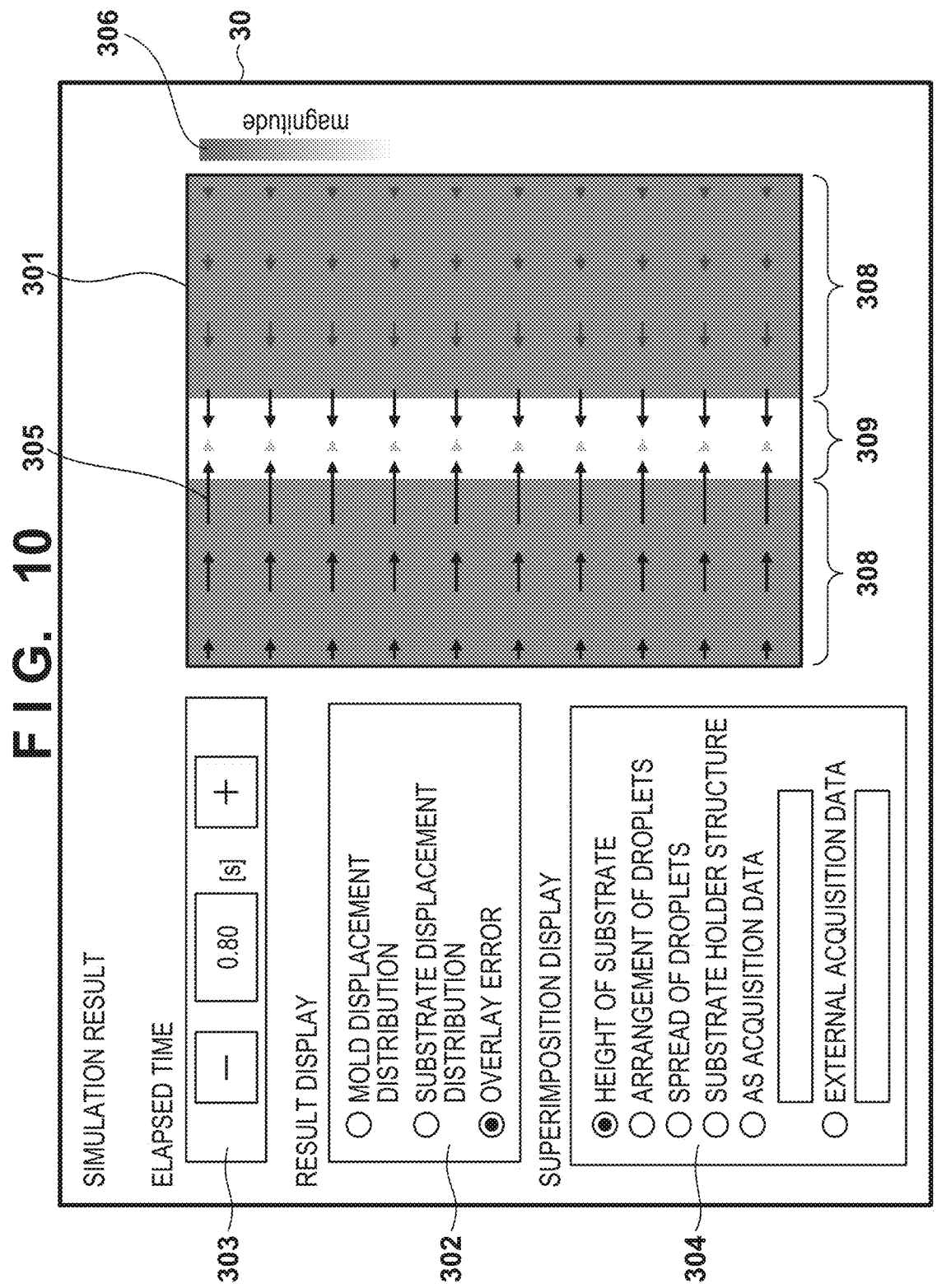
FIG. 10 is a view showing a display example of a display.

FIG. 10 shows an example in which input information representing the surface structure (height distribution) of the substrate S is displayed to be superimposed, as a two-dimensional image, on the distribution of distortion in the visual window 301. A part of the pattern region PR is displayed in an enlarged state in the visual window 301. In the two-dimensional image of the input information representing the surface structure of the substrate S, the height of the substrate S is visualized by a color gradation, and the color bar 306 shows the relationship between the height of the substrate and a color gradation. In the example shown in FIG. 10, a region 308 indicates a region where the height of the substrate S is relatively high, and a region 309 indicates a region where the height of the substrate S is relatively low. In this example, the direction of distortion is reversed from the region 309 as the boundary. It can therefore be judged that the principal factor of the distortion displayed in the visual window 301 is the change of the height of the substrate S. In this way, when the distribution of distortion and the input information representing the surface structure (height distribution) of the substrate S are displayed in a superimposed manner, the user can intuitively recognize the causal relationship between the distortion and the surface structure of the substrate. In a case where it is judged that the principal factor of the distortion is the change of the height of the substrate, the distortion can be reduced by, for example, increasing the droplet density of the curable composition IM in the region 309 where the height of the substrate S is low.

FIG. 11 shows an example in which input information representing the distribution (arrangement) of a plurality of droplets of the curable composition IM on the substrate S is displayed to be superimposed, as a two-dimensional image, on the distribution of distortion in the visual window 301. A part of the pattern region PR is displayed in an enlarged state in the visual window 301. The two-dimensional image of the input information representing the distribution of the plurality of droplets visualizes the positions of a plurality of droplets 310 arranged on the substrate by the dispenser DSP. In the example shown in FIG. 11, the density of droplets in a range surrounded by a dotted line 311 is relatively higher than in the remaining range. In this example, the distortion is large in the region (around the dotted line 311) transitioning from the region where the density of the droplets is high to the region where the density is low. It can therefore be judged that the principal factor of the distortion displayed in the visual window 301 is the change of the density of the droplets. In this way, when the distribution of distortion and the input information representing the distribution of the plurality of droplets are displayed in a superimposed manner, the user can intuitively recognize the causal relationship between the distortion and the distribution of the plurality of droplets.

Figure 12B:
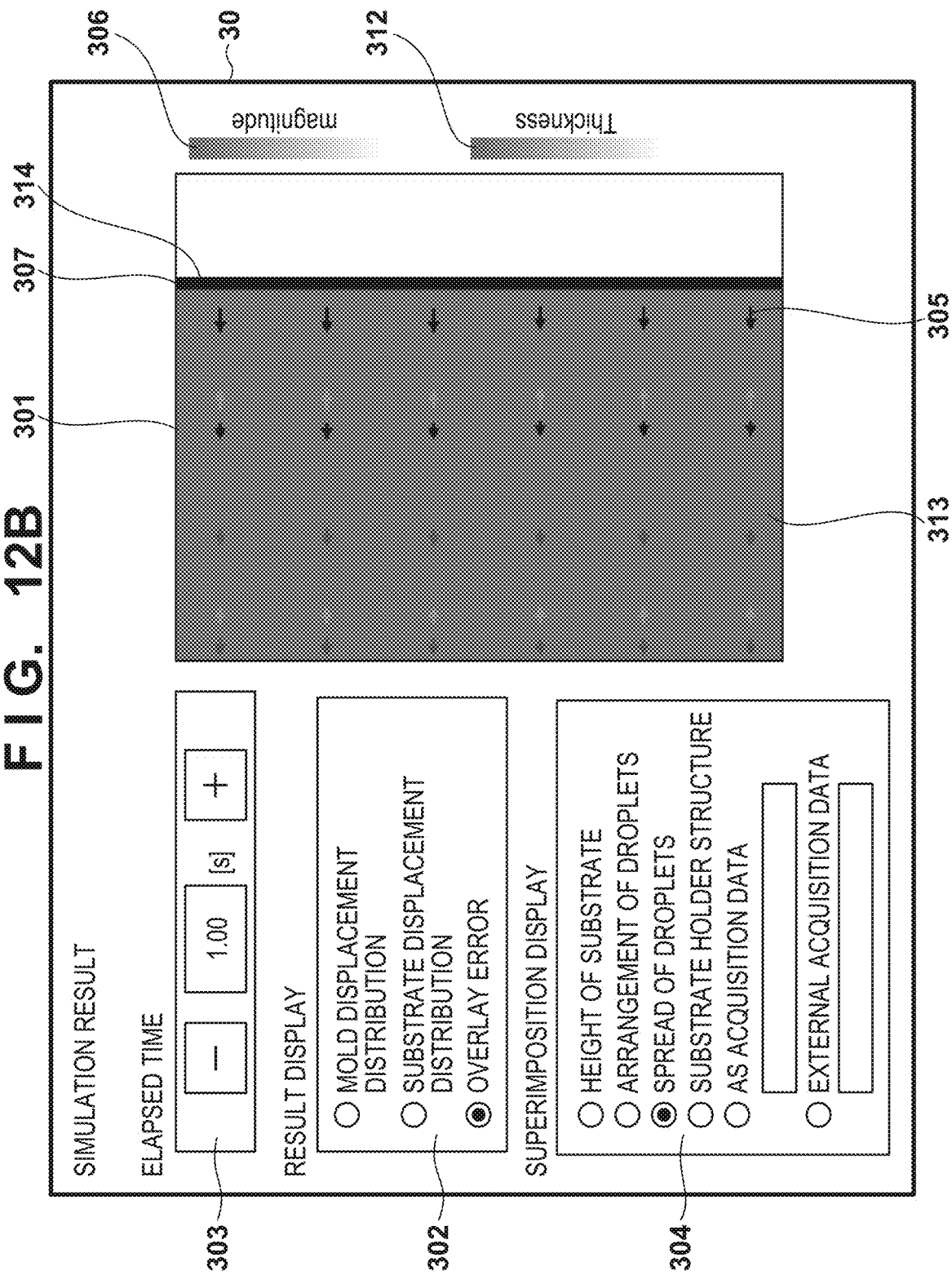
FIG. 12B is a view showing a display example of a display.

FIGS. 12A to 12C show an example in which output information representing the spread of the curable composition IM is displayed to be superimposed, as a two-dimensional image, on the distribution of distortion in the visual window 301. A part of the pattern region PR, including the outer periphery 307, is displayed in an enlarged state in the visual window 301. In this example, the simulation result of the behavior (spread) of the curable composition IM and the distribution of distortion are displayed in the visual window 301 such that these temporally match. A film 313 formed by connecting a plurality of droplets of the curable composition IM shows a region where the pattern region PR and the curable composition IM are in contact as a plane projected onto the X-Y plane. In the output information representing the spread of the curable composition IM, the thickness of the film 313 of the curable composition IM is visualized by a color gradation, and a color bar 312 shows the relationship between the thickness of the curable composition IM and a color gradation.

In the example shown in FIG. 12A, the distortion becomes larger as it comes close to the outer periphery 307 of the pattern region PR. This is because the end portion of the pattern region PR is deflected by the meniscus pressure, as shown in FIGS. 5A to 5D. FIG. 12B shows the simulation result after the time has further elapsed from FIG. 12A. A projecting portion 314 (seep-out portion) is a portion where the curable composition IM that has reached the outer periphery 307 of the pattern region PR projects from the outer periphery 307. The curable composition IM in the projecting portion 314 is thicker than in the remaining portions, and this can be visualized by making the color gradation representing the thickness of the curable composition IM darker than in the remaining portions. In the example shown in FIG. 12B, since the meniscus pressure on the surface of the curable composition IM projecting from the outer periphery 307 is low, the distortion is smaller as compared to FIG. 12A. In this way, when the distribution of distortion and the output information representing the spread of the curable composition IM are displayed in a superimposed manner, the user can intuitively recognize the causal relationship between the distortion and the spread of the curable composition IM. For example, upon judging that the change of distortion caused by the spread of the curable composition IM is large, the user can reconsider the filling time of the curable composition IM into the concave portions of the mold M or the density/arrangement of the droplets of the curable composition IM near the outer periphery 307 of the pattern region PR. This can reduce the distortion caused by the spread of the curable composition IM. Here, to assist confirming the causal relationship between the filling time and the distortion, a function of displaying a graph showing the temporal change of distortion may be provided, as shown in FIG. 12C. The graph shows, for example, the relationship between the elapsed time and the magnitude of distortion, and can be displayed in a popup window 316. Also, the graph may show the temporal change of distortion at coordinates (portion) in the visual window 301 designated by the user using a cursor 315 via the input device 40.

FIG. 13 shows an example in which input information representing the structure of the substrate holder SH is displayed to be superimposed, as a two-dimensional image, on the distribution of distortion in the visual window 301. A part of the substrate holder SH including the rib RI is displayed in an enlarged state in the visual window 301. In the example shown in FIG. 13, the direction of distortion is reversed from the rib RI as the boundary. It can therefore be judged that the principal factor of the distortion displayed in the visual window 301 is the deflection of the substrate S, which occurs when the substrate holder SH holds the substrate S. In this way, when the distribution of distortion and the input information representing the structure of the substrate holder SH are displayed in a superimposed manner, the user can intuitively recognize the causal relationship between the distortion and the structure of the substrate holder SH. In the example shown in FIG. 13, the distortion can be reduced by, for example, correcting the droplet arrangement of the curable composition IM around the rib RI.

As described above, in this embodiment, the input information used to predict the behavior of the curable composition IM and/or the output information representing the simulation result of the behavior of the curable composition IM is displayed to be superimposed, as a two-dimensional image, on the distribution of distortion. This allows the user to intuitively and easily recognize the causal relationship between the distribution of distortion and information (item) that can be the occurrence factor of the distortion. That is, since the user can easily recognize the principal factor of distortion and appropriately adjust the film forming conditions in accordance with the principal factor, time needed to adjust the film forming conditions can be reduced.

Second Embodiment

The second embodiment according to the present invention will be described. In this embodiment, an example in which measurement information representing a result of actually measuring the overlay error between a mold M (pattern region PR) and a substrate S (shot region) is displayed to be superimposed, as a two-dimensional image, on the distribution of distortion will be described. Note that this embodiment basically takes over the first embodiment, and matters that are not mentioned in this embodiment can comply with the first embodiment.

FIG. 14 shows an example in which output information representing the spread of a curable composition IM and measurement information representing the measurement result of the overlay error by an alignment scope AS are displayed to be superimposed on a distribution of distortion obtained by a simulation in a visual window 301. The output information representing the spread of the curable composition IM can be displayed as a two-dimensional image in the visual window 301, and the measurement information representing the measurement result by the alignment scope AS can be displayed as a vector 317 of a dotted line in the visual window 301.

Also, in a case where a part of the visual window 301 is designated by the user using a cursor 315 via an input device 40, a popup window 318 is displayed. In the popup window 318, a graph showing the temporal change of distortion obtained by a simulation and the temporal change of the measurement result of the overlay error obtained by the alignment scope AS is displayed concerning the coordinates (portion) designated by the user. The example in FIG. 14 shows that the distortion (overlay error) increases more quickly in the simulation than in the measurement result by the alignment scope AS. In this example, it can be considered that the deflection of the pattern region PR caused by the meniscus pressure progresses more quickly in an actual phenomenon than in the simulation result. An example of the factor is the difference in the manner the curable composition IM spreads. Based on the display of the visual window 301 (and the popup window 318), the user can reconsider the simulation conditions and/or the film forming conditions.

Here, in the example shown in FIG. 14, the overlay error of one point measured by the alignment scope AS is displayed in comparison with the simulation result. However, the present invention is not limited to this. A deformed shape overall the pattern region PR, which is calculated from the overlay errors of a plurality of points measured by the alignment scope AS, more specifically, a component such as a magnification, a rhombus, a trapezoid, or an arch shape may be displayed in comparison with the simulation result. The component such as a magnification, a rhombus, a trapezoid, or an arch shape can be calculated by, for example, a least squares method based on the distortion of the plurality of points.

FIG. 15 shows an example in which measurement information representing the measurement result of the overlay error by an external apparatus is displayed to be superimposed on a distribution of distortion obtained by a simulation in the visual window 301. The external apparatus is an apparatus provided outside a film forming apparatus IMP and can be configured to measure the overlay error between a pattern already formed on a substrate and a pattern formed on the curable composition IM on the substrate by film forming processing. Measurement information representing the measurement result of the overlay error by the external apparatus can be displayed as vectors 319 of dotted lines in the visual window 301. In the example shown in FIG. 15, overlay errors measured by the external apparatus at the four corners of the pattern region PR are larger than distortion (overlay error) calculated by a simulation and extend toward the center of the pattern. In this example, it can be considered that the four corners of the pattern region PR are deflected more largely in an actual phenomenon than in the simulation result. An example of the factor is the error of a force F acting from a mold driver MD on the mold M. Based on the display of the visual window 301, the user can reconsider the simulation conditions and/or the film forming conditions.

Here, an information processing apparatus 1 (processor 10) may have a function of processing the measurement result of the overlay error acquired by the alignment scope AS or the external apparatus. For example, the position/shape of the whole of the pattern region PR in the data acquired by the alignment scope AS or the external apparatus can be adjusted. That is, a positional deviation component of low order (for example, a shift, a rotation, a rhombus, a magnification component, or the like) of the pattern region PR in the data can be removed such that the position/shape of the pattern region PR in the data matches that of the pattern region PR in the simulation result. This is because distortion caused by the convex and concave portions of the substrate S, the distribution of the plurality of droplets of the curable composition IM, or the surface tension of the curable composition IM occurs in a local region of the pattern region PR, and it is therefore necessary to match the positions/shapes to display the local region in an enlarged state.

The processing of data is not limited to those described above and, for example, a positional deviation component that can be generated by a matter not considered by the information processing apparatus 1, such as the distortion adjustment component of a mold distortion adjuster MC and a substrate distortion adjuster SC or a positional deviation from the design value of the pattern formed on the mold M or the substrate S in advance, may be removed. In addition, distortion may be calculated by incorporating, in the prediction calculation of the information processing apparatus 1, correction control of the positional deviation between the substrate S and the mold M, which is acquired by the alignment scope AS, for example, closed loop control of the mold distortion adjuster MC or a substrate driving mechanism SD, which can be executed in film forming processing.

As described above, in this embodiment, measurement information representing the measurement result of the overlay error is displayed to be superimposed on the distribution of distortion obtained by a simulation. Since this allows the user to compare the simulation result with the measurement result, it is possible to properly grasp the difference between the simulation result and the measurement result, and appropriately adjust the simulation conditions and/or the film forming conditions. That is, the user can reduce time needed to adjust the simulation conditions and/or the film forming conditions.

Third Embodiment

The third embodiment according to the present invention will be described. In the above-described first and second embodiments, an example in which superimposition display information selected by the user from a plurality of pieces of superimposition display information (for example, input information) is displayed to be superimposed on the distribution of distortion obtained by a simulation has been described. In this embodiment, an example in which of a plurality of pieces of input information, input information that has the highest correlation with the distribution of distortion obtained by a simulation is displayed to be superimposed on the distribution of distortion will be described. Note that this embodiment basically takes over the first embodiment, and matters that are not mentioned in this embodiment can comply with the first embodiment. Also, this embodiment may take over the second embodiment.

Figure 16:
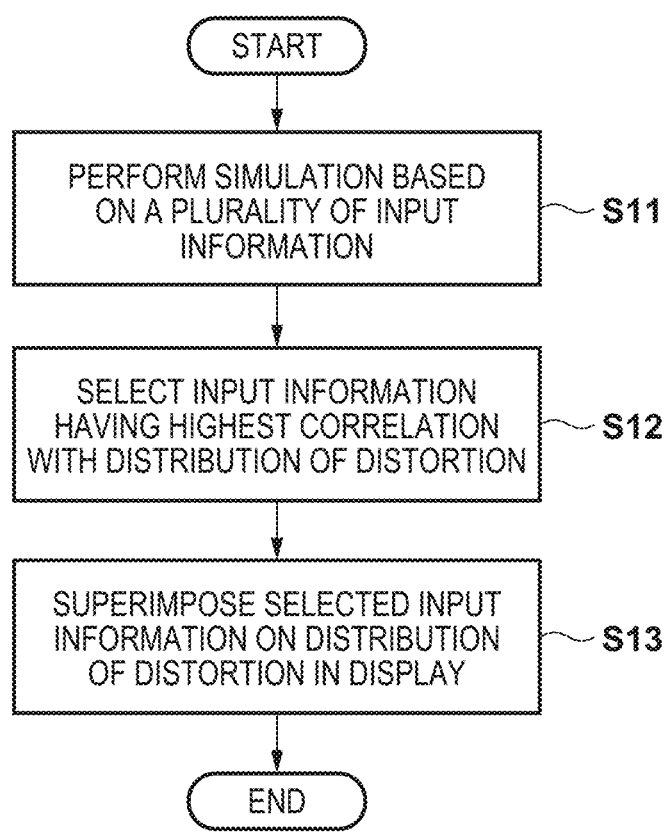
FIG. 16 is a flowchart showing processing executed by the information processing apparatus.

FIG. 16 is a flowchart showing processing executed by an information processing apparatus 1 (processor 10) in accordance with a simulation program 21 in this embodiment.

In step S11, the information processing apparatus 1 performs a simulation of the behavior of a curable composition IM in film forming processing based on a plurality of pieces of input information serving as simulation conditions (simulation step (calculation step)). As described above, the plurality of pieces of input information can include information representing the surface structure of a mold M, information representing the surface structure of a substrate S, information representing the distribution of a plurality of droplets of the curable composition IM arranged on the substrate S, and information representing the structure of the holding surface of a substrate holder SH. In the simulation, the behavior of the curable composition IM in film forming processing is predicted, and simultaneously, the distribution of distortion that occurs in at least one of the substrate S and the mold M in film forming processing is calculated.

In step S12, the information processing apparatus 1 selects, from the plurality of pieces of input information, input information having the highest correlation with the distribution of distortion calculated in step S11 (selection step). For example, the information processing apparatus 1 calculates, for each of the plurality of pieces of input information, correlation with the distribution of distortion calculated in step S11 and selects input information with the highest correlation, as superimposition display information, from the plurality of pieces of input information. As for the correlation, known image processing is performed for the two-dimensional image of the input information, thereby extracting feature points of the two-dimensional image. Then, the correlation can be calculated from the degree of matching between each extracted feature point and the direction and length of a vector 305 representing the distribution of distortion. As the feature points of the two-dimensional image of the input image, for example, a step portion of the mold M, a step portion of the substrate, and a density change portion of droplets can be used. Alternatively, the correlation mag be calculated using a model that receives input information as an input and outputs the correlation of the distribution of distortion with the input information. The model can be generated by machine learning using the Artificial Intelligence (AI) technology.

In step S13, the information processing apparatus 1 displays, on a display 30, the input information selected in step S12 to be superimposed as a two-dimensional image on the distribution of distortion calculated in step S11. Since this allows the user to properly and easily recognize, of the plurality of pieces of input information, the input information as the principal factor of the distribution of distortion and appropriately adjust the film forming conditions in accordance with the principal factor, time needed to adjust the film forming conditions can be reduced.

Fourth Embodiment

In the above embodiments, an example in which the information processing apparatus 1 (simulation apparatus) for predicting the behavior of the curable composition IM in film forming processing is formed separately from the film forming apparatus IMP has been described. However, the present invention is not limited to this, and an information processing apparatus 1 (simulation apparatus) may be incorporated in a film forming apparatus IMP. In this case, based on the prediction of the behavior of the curable composition by the information processing apparatus 1, the film forming apparatus IMP can control processing (film forming processing) of bringing a curable composition arranged on a first member into contact with a second member and forming a film of the curable composition on the first member. Also, in the above embodiments, a form in which the mold M has a pattern has been described. However, the present invention can also be applied to a form in which the substrate S has a pattern.

Embodiment of Article Manufacturing Method

An article manufacturing method according to this embodiment can include a step of determining a condition of film forming processing based on a result of executing a simulation method, and a step of executing the film forming processing in accordance with the condition. In the step of determining the condition of the film forming processing, the condition of the film forming processing may be decided while repeating the simulation method.

Figure 17A:
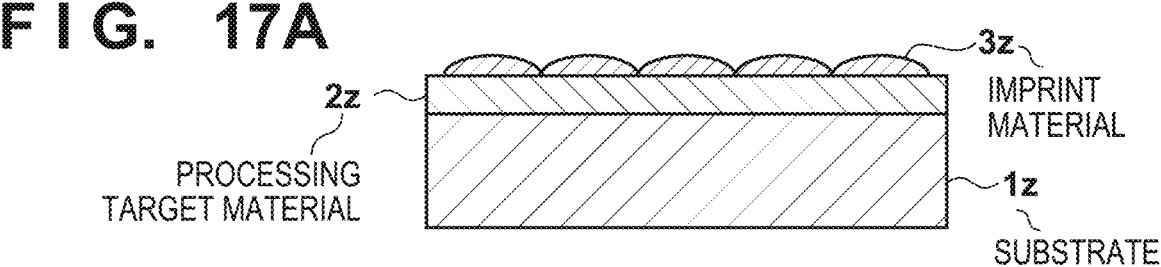
FIGS. 17A to 17F are views for explaining an article manufacturing method.

FIGS. 17A to 17F show a more detailed example of the article manufacturing method. As shown in FIG. 17A, a substrate 1z such as a silicon wafer with a target material 2z to be processed, such as an insulator, formed on the surface is prepared. Next, an imprint material 3z is applied to the surface of the target material 2z by an inkjet method or the like. A state in which the imprint material 3z is applied as a plurality of droplets onto the substrate is shown here.

Figure 17B:
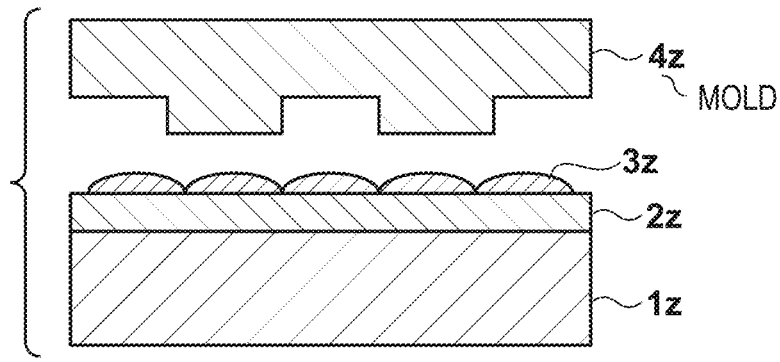
Figure 17C:
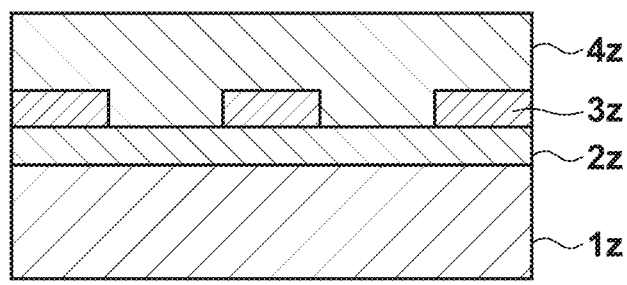

As shown in FIG. 17B, a side of a mold 4z for imprint, where a pattern with convex and concave portions is formed, is directed to face the imprint material 3z on the substrate. As shown in FIG. 17C, the mold 4z and the substrate 1z to which the imprint material 3z is applied are brought into contact with each other, and a pressure is applied. The gap between the mold 4z and the target material 2z is filled with the imprint material 3z. In this state, by irradiating the imprint material 3z with energy for curing through the mold 4z, the imprint material 3z is cured.

Figure 17D:
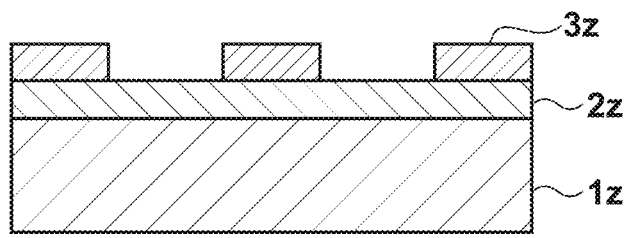

As shown in FIG. 17D, after the imprint material 3z is cured, the mold 4z is separated from the substrate 1z. Then, the pattern of the cured product of the imprint material 3z is formed on the substrate 1z. In the pattern of the cured product, the concave portion of the mold corresponds to the convex portion of the cured product, and the convex portion of the mold corresponds to the concave portion of the cured product. That is, the pattern with convex and concave portions in the mold 4z is transferred to the imprint material 3z.

Figure 17E:
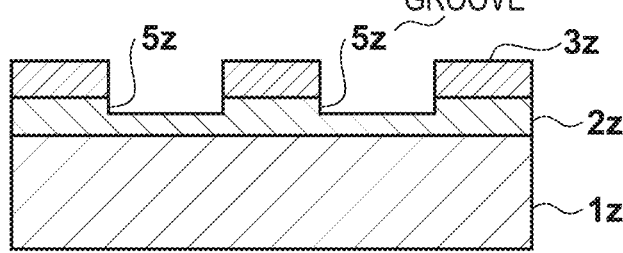
Figure 17F:
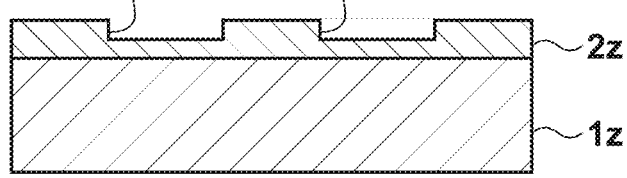

As shown in FIG. 17E, by performing etching using the pattern of the cured product as an etching resistant mask, a portion of the surface of the target material 2z where the cured product does not exist or remains thin is removed to form a groove 5z. As shown in FIG. 17F, by removing the pattern of the cured product, an article with the grooves 5z formed in the surface of the target material 2z can be obtained. Here, the pattern of the cured product is removed. However, instead of removing the pattern of the cured product after processing, it may be used as, for example, an interlayer dielectric film included in a semiconductor device or the like, that is, a constituent member of an article.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-007272 filed on Jan. 20, 2022, which is hereby incorporated by reference herein in its entirety.

What is claimed is:
1. A simulation method of predicting, by an information processing apparatus, a behavior of a composition in processing of bringing the composition arranged on a first member into contact with a second member and forming a film of the composition on the first member, comprising:
predicting the behavior of the composition in the processing;

calculating a distribution of distortion that occurs in at least one of the first member and the second member in the processing; and displaying the distribution of distortion calculated in the calculating, wherein in the displaying, in a case where at least one piece of input information is selected from a plurality of pieces of input information used to predict the behavior of the composition, the at least one piece of input information is displayed to be superimposed as a two-dimensional image on the distribution of distortion.

2. The method according to claim 1, wherein in the displaying, the at least one piece of input information selected by a user from the plurality of pieces of input information is displayed to be superimposed as the two-dimensional image on the distribution of distortion.

3. The method according to claim 1, further comprising selecting, from the plurality of pieces of input information, input information having a highest correlation with the distribution of distortion, wherein in the displaying, the input information selected in the selecting is displayed to be superimposed as the two-dimensional image on the distribution of distortion.

4. The method according to claim 1, wherein one of the plurality of pieces of input information is information representing a surface structure of the first member.

5. The method according to claim 1, wherein one of the plurality of pieces of input information is information representing a surface structure of the second member.

6. The method according to claim 1, wherein one of the plurality of pieces of input information is information representing a distribution of the composition arranged on the first member.

7. The method according to claim 1, wherein one of the plurality of pieces of input information is information representing a structure of a holding surface that holds the first member.

8. The method according to claim 1, wherein in the displaying, in a case where output information representing a prediction result of the behavior of the composition is selected, the output information is displayed to be superimposed as the two-dimensional image on the distribution of distortion.

9. The method according to claim 8, wherein in the predicting, a temporal change of the behavior of the composition in the processing is predicted, in the calculating, a temporal change of the distribution of distortion is calculated, and in the displaying, the output information is displayed to be superimposed as the two-dimensional image on the distribution of distortion such that the prediction result of the behavior of the composition and the distribution of distortion temporally match.

10. The method according to claim 1, wherein in the displaying, in a case where measurement information representing a measurement result of an overlay error between the first member and the second member is selected, the measurement information is displayed to be superimposed on the distribution of distortion.

11. The method according to claim 10, wherein in the displaying, in a case where the measurement information is selected, concerning a designated portion of the distribution of distortion, a graph showing a temporal change of the distortion calculated in the calculating and a temporal change of the measurement result of the overlay error is displayed.

12. The method according to claim 1, wherein the simulation method predicts the behavior of the composition arranged as a plurality of droplets on the first member in the processing.

13. The method according to claim 1, wherein the composition is a curable composition.

14. An article manufacturing method comprising:

determining condition of processing based on a result of executing a simulation method according to claim 1; and executing the processing in accordance with the condition.

15. A non-transitory computer-readable storage medium storing a program for causing a computer to execute a simulation method according to claim 1.

16. A simulation apparatus for predicting a behavior of a composition in processing of bringing the composition arranged on a first member into contact with a second member and forming a film of the composition on the first member, wherein the simulation apparatus executes:

predicting the behavior of the composition in the processing;

calculating a distribution of distortion that occurs in at least one of the first member and the second member in the processing; and displaying the distribution of distortion calculated in the calculating, and wherein in the displaying, in a case where at least one piece of input information is selected from a plurality of pieces of input information used to predict the behavior of the composition, the at least one piece of input information is displayed to be superimposed as a two-dimensional image on the distribution of distortion.

17. A film forming apparatus incorporating a simulation apparatus according to claim 16, wherein the film forming apparatus controls processing of bringing a composition arranged as a plurality of droplets on a first member into contact with a second member and forming a film of the composition on the first member, based on prediction of a behavior of the composition by the simulation apparatus.

* * * * *